United States Patent
Yabe et al.

(10) Patent No.: US 8,698,743 B2
(45) Date of Patent: Apr. 15, 2014

(54) INFORMATION PROCESSING APPARATUS, METHOD AND PROGRAM

(75) Inventors: Toshiharu Yabe, Tokyo (JP); Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/546,801

(22) Filed: Jul. 11, 2012

(65) Prior Publication Data

US 2012/0278720 A1 Nov. 1, 2012

Related U.S. Application Data

(63) Continuation of application No. 12/539,422, filed on Aug. 11, 2009, now Pat. No. 8,237,655.

(30) Foreign Application Priority Data

Aug. 14, 2008 (JP) ................. P2008-208948

(51) Int. Cl.
*G06F 3/033* (2013.01)
*G09G 5/08* (2006.01)

(52) U.S. Cl.
USPC .......................................... 345/157; 345/158

(58) Field of Classification Search
USPC .................. 345/156, 173, 157, 158
See application file for complete search history.

(56) References Cited

U.S. PATENT DOCUMENTS

| | | | |
|---|---|---|---|
| 5,594,469 A | 1/1997 | Freeman et al. | |
| 6,160,899 A | 12/2000 | Lee et al. | |
| 6,191,773 B1 | 2/2001 | Maruno et al. | |
| 2001/0030668 A1 * | 10/2001 | Erten et al. | 345/863 |
| 2007/0064140 A1 * | 3/2007 | Kitaura | 348/333.01 |
| 2008/0052643 A1 | 2/2008 | Ike et al. | |
| 2009/0253463 A1 * | 10/2009 | Shin et al. | 455/563 |

FOREIGN PATENT DOCUMENTS

| | | |
|---|---|---|
| JP | 02-132510 | 5/1990 |
| JP | 7-141101 | 6/1995 |
| JP | 8-6708 | 1/1996 |
| JP | 8-315154 | 11/1996 |
| JP | 9-128141 | 5/1997 |

(Continued)

OTHER PUBLICATIONS

Notification of the First Office Action mailed by the State Intellectual Property Office of People's Republic of China on Sep. 30, 2013, in Chinese Patent Application No. 201200637792.8 (16 pages).

*Primary Examiner* — Kevin M Nguyen
(74) *Attorney, Agent, or Firm* — Finnegan, Henderson, Farabow, Garrett & Dunner, L.L.P.

(57) ABSTRACT

An information processing apparatus includes an imaging unit, an icon display control unit causing a display to display an operation icon, a pickup image display processing unit causing the display to sequentially display an input operation region image constituted by, among pixel regions constituting an image picked up by the imaging unit, a pixel region including at least a portion of a hand of a user, an icon management unit managing event issue definition information, which is a condition for determining that the operation icon has been operated by the user, for each operation icon, an operation determination unit determining whether the user has operated the operation icon based on the input operation region image displayed in the display and the event issue definition information, and a processing execution unit performing predetermined processing corresponding to the operation icon in accordance with a determination result by the operation determination unit.

23 Claims, 18 Drawing Sheets

(56) References Cited

FOREIGN PATENT DOCUMENTS

| | | |
|---|---|---|
| JP | 09-185456 | 7/1997 |
| JP | 2001-5599 | 1/2001 |
| JP | 2004-356819 | 12/2004 |
| JP | 2006-268212 | 10/2006 |
| JP | 2008-118633 | 5/2008 |

* cited by examiner

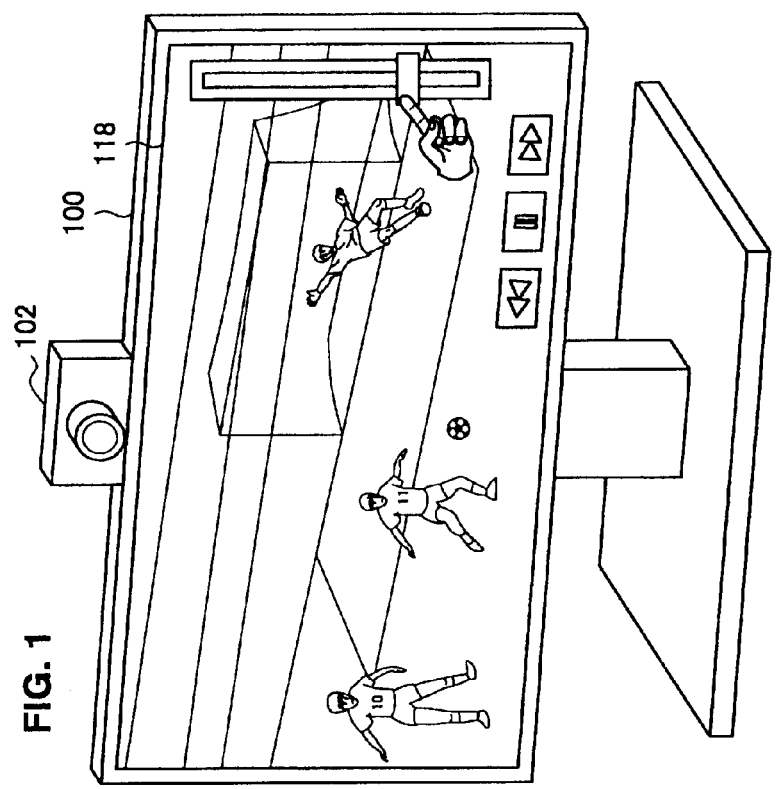
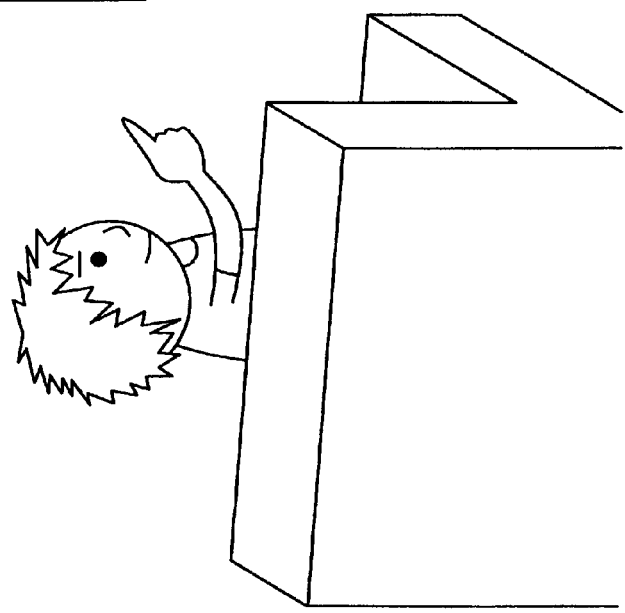
FIG. 1

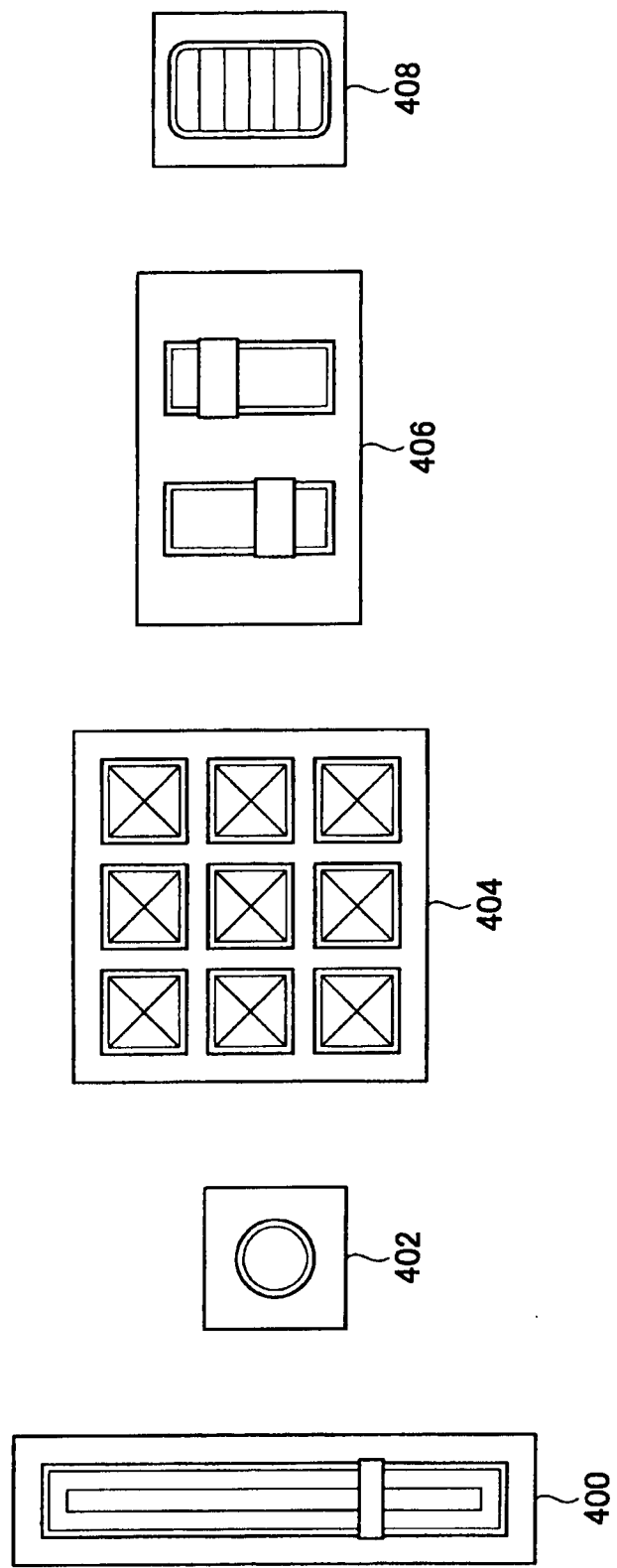

FIG. 5

| FUNCTION OF TV 100 | GUI | EVENT ISSUE DEFINITION INFORMATION |
|---|---|---|
| VOLUME ADJUSTMENTS | | CONTINUOUS HORIZONTAL MOVEMENT IN FIVE FRAMES FROM CURSOR POSITION |
| CHANNEL SELECTION | | CONTINUOUS DOWNWARD MOVEMENT IN THREE FRAMES FROM BUTTON POSITION |
| SOUND DEADENING SETTING | | CONTINUOUS VERTICAL MOVEMENT IN FIVE FRAMES FROM BUTTON POSITION |
| PROGRAM GUIDE DISPLAY | | CONTINUOUS DOWNWARD MOVEMENT IN THREE FRAMES FROM BUTTON POSITION |
| ... | ... | ... |

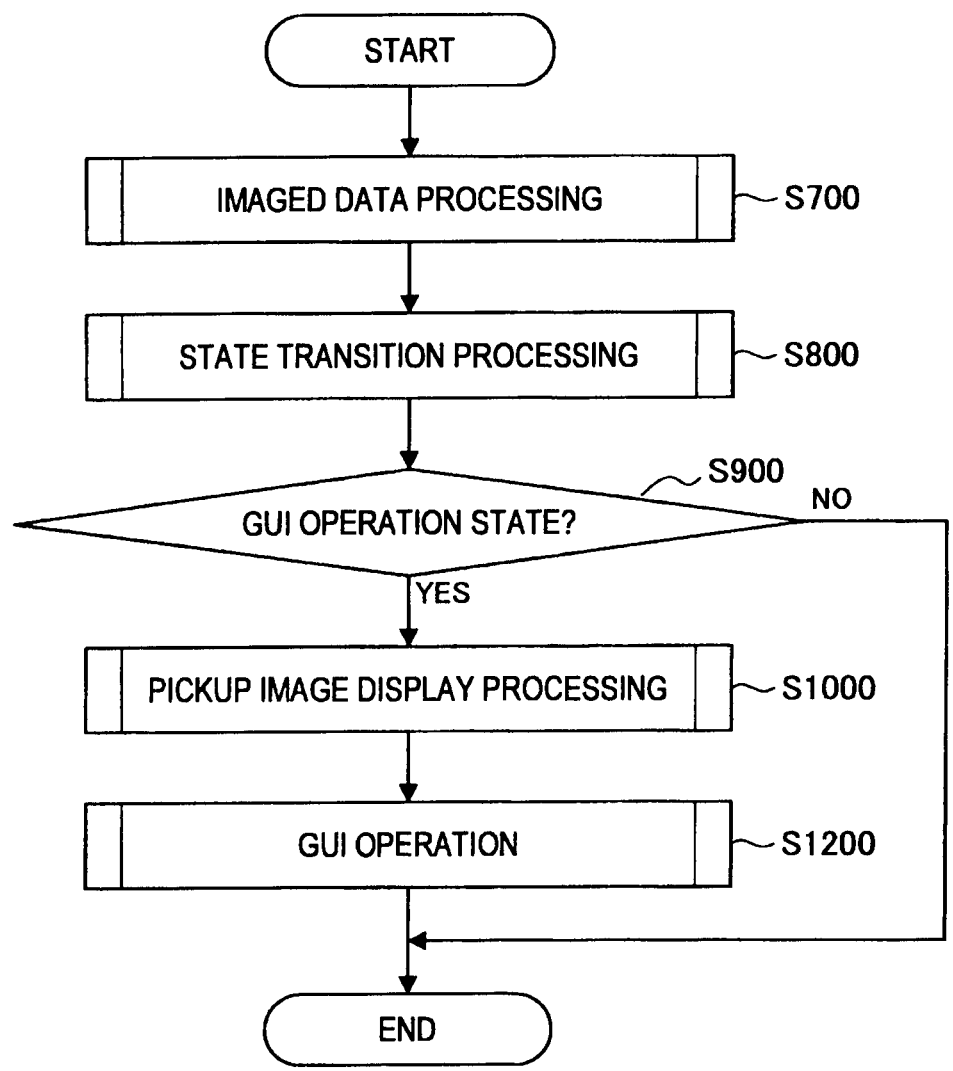

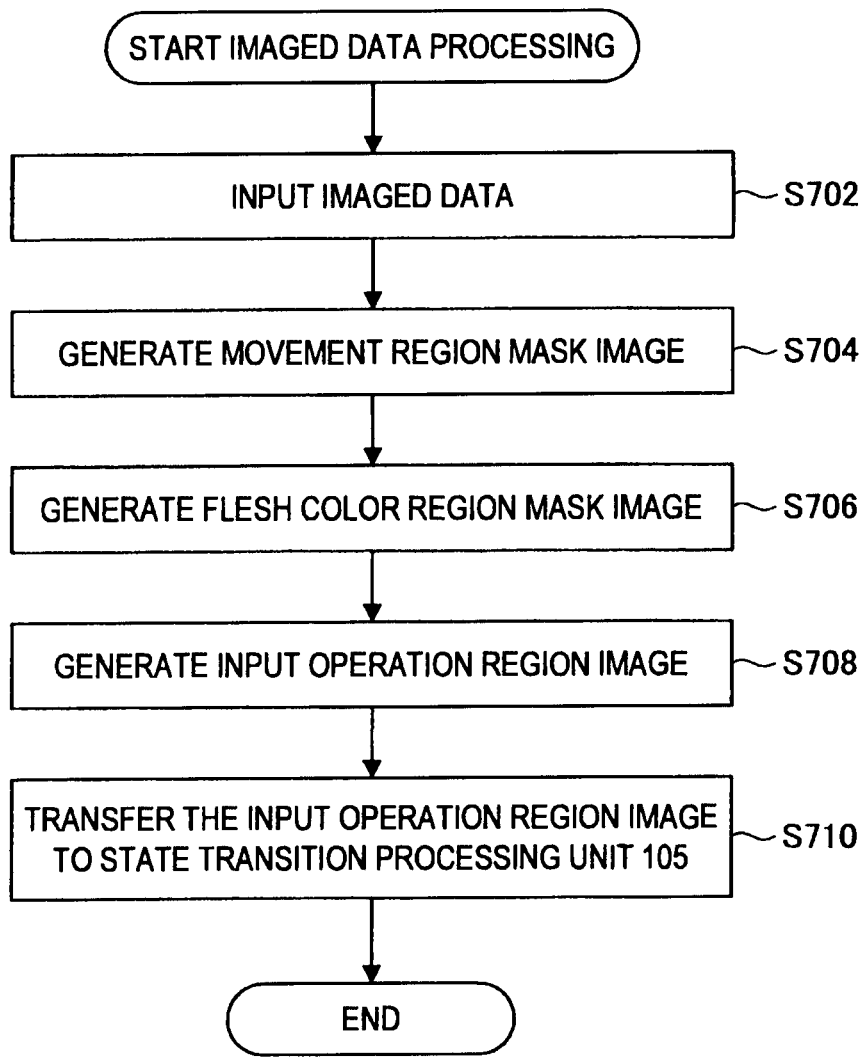

TRAJECTORY UPDATE

TRAJECTORY INTERPOLATION PROCESSING

INFORMATION PROCESSING APPARATUS, METHOD AND PROGRAM

This is a continuation of and claims the benefit of priority to U.S. patent application Ser. No. 12/539,422, filed on Aug. 11, 2009 now U.S. Pat. No. 8,237,655 (now allowed), which claims the benefit of priority to Japanese Patent Application No. 2008-208948, filed on Aug. 14, 2008. The contents of the above-referenced applications are expressly incorporated herein by reference to their entireties.

BACKGROUND OF THE INVENTION

1. Field of the Invention

The present invention relates to an information processing apparatus, an information processing method, and an information processing program.

2. Description of the Related Art

In recent years, with development of TV video delivery technology and increasing sophistication of functions of network devices such as recording/reproducing devices, TV sets are equipped with various functions. Accordingly, more complex operations are demanded from users via a remote control or the like. On the other hand, due to poor operability of a remote control with many operation buttons for users, remote controls with a simple button configuration are now mainstream of remote controls. However, even when a remote control with a simple button configuration is used, it is necessary for the user to send instructions many times from the remote control to a hierarchical menu displayed in a display. After all, any one of complex operations via buttons constituting a remote control and operations of complex menus displayed in a display via a remote control with a simple button configuration are demanded from the user.

As a method of eliminating troublesomeness of operability via a remote control, for example, Japanese Patent Application Laid-Open No. 2004-356819 discloses a technology to execute various functions of a TV set by movements of a hand of the user picked up by an imaging apparatus without using a remote control. The method described in Japanese Patent Application Laid-Open No. 2004-356819 causes a TV display to make a menu display using an object of finger or the like. The TV set is equipped with an imaging apparatus to pick up images of a user. Further, whether movement of a finger of the user picked up by the imaging unit and a finger in a menu display match is determined and if a determination of matching is made, the function corresponding to the menu can be executed. Accordingly, the user can select various functions equipped with the TV set.

SUMMARY OF THE INVENTION

However, according to the method described in Japanese Patent Application Laid-Open No. 2004-356819, it is necessary for the user to move a finger according to a menu display represented by an object of finger to select various functions displayed in a display. Therefore, it is necessary for the user to make a motion as shown in the display. There is an issue that it is difficult to select various functions provided with a TV set by intuitively moving a finger.

The present invention has been made in view of the above issue and it is desirable to provide a novel and improved information processing apparatus enabling a user to select/execute various functions by intuitively moving a finger of the user after operation icons being displayed in a display, an information processing method, and an information processing program.

According to an embodiment of the present invention, there is provided an information processing apparatus, including: an imaging unit which picks up an object; an icon display control unit which causes a display to display an operation icon corresponding to predetermined processing; a pickup image display processing unit which causes the display to sequentially display an input operation region image constituted by, among pixel regions constituting an image picked up by the imaging unit, a pixel region including at least a portion of a hand of a user; an icon management unit which manages event issue definition information, which is a condition for determining that the operation icon has been operated by the user, for each operation icon; an operation determination unit which determines whether the user has operated the operation icon based on the input operation region image displayed in the display and the event issue definition information; and a processing execution unit which performs predetermined processing corresponding to the operation icon in accordance with a determination result by the operation determination unit.

According to the above configuration, the information processing apparatus can cause the display to sequentially display an input operation region image constituted by a pixel region including at least a portion of a hand of a user from an image picked up by the imaging unit. The information processing apparatus can cause the display to display an operation icon corresponding to predetermined processing. The information processing apparatus can manage event issue definition information, which is a condition for determining that the operation icon the display is caused to display has been operated by the user. The information processing apparatus can determine whether the user has operated the operation icon based on the input operation region image and operation icon displayed in the display and the event issue definition information. Further, the information processing apparatus can perform predetermined processing corresponding to the operation icon in accordance with a result of the determination.

The operation determination unit may recognize movement of the hand of the user picked up by the imaging unit by calculating a center of gravity of the pixel regions constituting the input operation region image and calculating a motion vector of the center of gravity by linking the center of gravity constituting the input operation region image sequentially displayed in the display.

The operation determination unit may determine whether the user has operated the operation icon based on the center of gravity, the motion vector and the event issue definition information.

The icon management unit may manage each operation icon displayed in the display by associating the operation icon with the event issue definition information corresponding to the operation icon and content of processing performed by the processing execution unit when the event issue definition information is met.

If the operation determination unit determines that a display icon displayed in the display has been operated by the user, the processing execution unit may perform processing content associated with the operation icon managed by the icon management unit.

The icon display control unit may update the operation icons displayed in the display depending on an operation by the user.

The information processing apparatus may further include a movement detection unit which detects a pixel region that changes by comparing an image picked up by the imaging unit with one picked up one frame before to generate a movement region mask image constituted by only the detected pixel region, and a flesh color detection unit which detects a pixel region having a predetermined hue in pixel regions constituting the image picked up by the imaging unit to generate a flesh color region mask image constituted by only the detected pixel region. In this case, the input operation region image may be constituted by a pixel region calculated by performing an AND operation of the pixel region constituting the movement region mask image and that constituting the flesh color region mask image.

The pickup image display processing unit may cause the display to display the input operation region image if a number of pixels constituting the input operation region image is equal to or greater than a predetermined number of pixels set in advance over a period equal to or longer than a predetermined time set in advance.

The pickup image display processing unit may scale the input operation region image in such a way that a ratio of the number of pixels constituting the input operation region image to the number of pixels displayable in the display becomes a predetermined ratio.

The display may be provided with an external device separated from the information processing apparatus. In this case, the information processing apparatus may cause the display provided with the external device to display the operation icon and the input operation region image.

The information processing apparatus may further include a display unit which displays predetermined video contained in a broadcast signal, and the display unit may also include the display.

The information processing apparatus my further include a sound input unit into which the user inputs a sound and a sound recognition processing unit which recognizes a type of sound input into the sound input unit. In this case, the icon management unit may manage information about the operation icon displayed in the display in accordance with the type of the sound for each type of the sound and the icon display control unit may cause the display to display the operation icon corresponding to the type of recognized sound based on the information managed by the icon management unit in accordance with the type of sound recognized by the sound recognition processing unit.

The icon display control unit may cause the display to display a trajectory of the center of gravity based on the motion vector of the center of gravity calculated by the operation determination unit.

If the trajectory of the center of gravity displayed in the display becomes a closed curve, the icon display control unit may cause the display to display the operation icon corresponding to predetermined processing concerning a display region enclosed by the closed curve.

According to another embodiment of the present invention, there is provided an information processing method including the steps of: picking up an object by an imaging unit; causing a display to display an operation icon corresponding to predetermined processing; causing the display to sequentially display an input operation region image constituted by, among pixel regions constituting an image picked up in the imaging step, a pixel region including at least a portion of a hand of a user; determining whether the user has operated the operation icon based on the operation icon displayed in the display in the icon display step, the input operation region image displayed in the display in the pickup image display step, and event issue definition information, which is managed for each operation icon and is a condition for determining that the operation icon has been operated by the user; and performing predetermined processing corresponding to the operation icon in accordance with a determination result in the operation determination step.

According to another embodiment of the present invention, there is provided an information processing program causing a computer to perform: imaging processing to pick up an object by an imaging unit; icon display processing to cause a display to display an operation icon corresponding to predetermined processing; pickup image display processing to cause the display to sequentially display an input operation region image constituted by, among pixel regions constituting an image picked up in an imaging processing, a pixel region including at least a portion of a hand of a user; operation determination processing to determine whether the user has operated the operation icon based on the operation icon displayed in the display in an icon display processing, the input operation region image displayed in the display in a pickup image display processing, and event issue definition information, which is managed for each operation icon and is a condition for determining that the operation icon has been operated by the user; and execution processing to perform predetermined processing corresponding to the operation icon in accordance with a determination result in an operation determination processing.

According to the embodiments of the present invention described above, a novel and improved information processing apparatus, an information processing method, and an information processing program enabling a user to select/execute various functions by intuitively moving a finger of the user after operation icons being displayed in a display, are provided.

BRIEF DESCRIPTION OF THE DRAWINGS

FIG. 1 is a conceptual diagram of an example of using an information processing apparatus according to an embodiment of the present invention;

FIG. 4 is an explanatory view exemplifying GUIs managed by a GUI management unit 110 in the embodiment;

FIG. 5 is an explanatory view exemplifying GUIs and event issue definition information managed by the GUI management unit 110 in the embodiment;

FIG. 6 is a flow chart showing an overall flow of processing in which a GUI operation is performed by a user using the TV 100 according to the embodiment;

FIG. 7 is a flow chart showing the detailed processing flow of imaged data processing at step 700 shown in FIG. 6 in the embodiment;

DETAILED DESCRIPTION OF THE PREFERRED EMBODIMENTS

Figure 2:
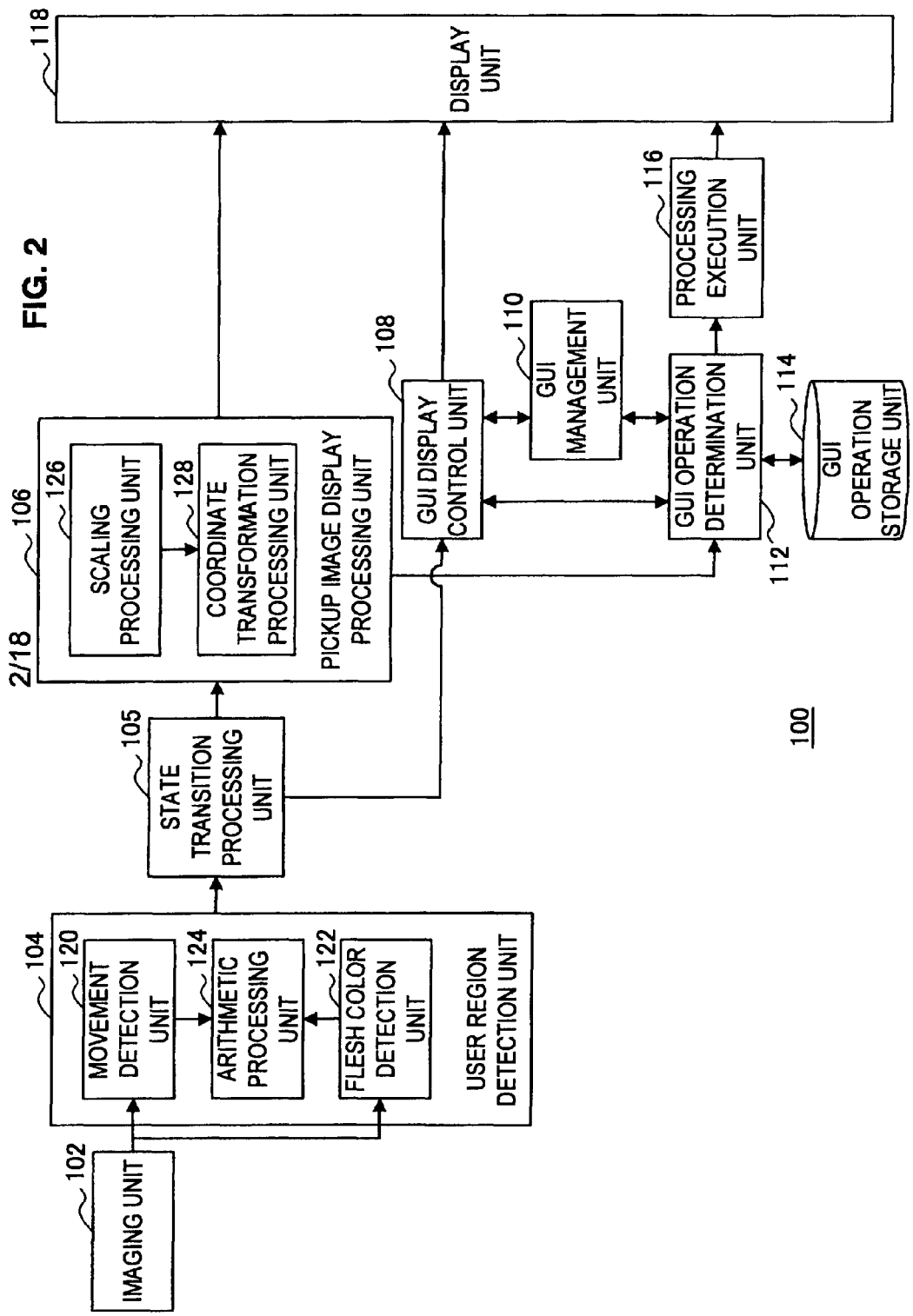
FIG. 2 is a block diagram showing a function configuration of a TV 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. Overview of embodiments of the present invention
2. Information processing apparatus according to an embodiment
  2-1. Function configuration of the TV 100
  2-2. Flow of processing in the present embodiment (imaging processing to GUI operation processing)
  2-3. Imaged data processing flow
  2-4. State transition processing flow
  2-5. Pickup image display processing flow
  2-6. GUI operation processing flow
3. Modifications
  3-1. First modification (using the sound input function)
  3-2. Second modification (using the cursor GUI)

1. Overview of Embodiments of the Present Invention

Before describing details of an information processing apparatus according to an embodiment of the present invention, an overview of embodiments of the present invention will first be provided. As described above, an information processing apparatus such as a TV set equipped with a display in the related art can display menus corresponding to various functions on the display using an object of finger of a user. Accordingly, the user can select various functions provided with the information processing apparatus such as a TV set by making a motion in agreement with a finger displayed on the display. However, it is necessary for the user to move a finger following instructions displayed on the display. Therefore, after all, it is difficult for the user to select various functions of an information processing apparatus by intuitive movement of a finger.

In contrast, an information processing apparatus according to an embodiment of the present invention enables the user to select/execute various functions provided with the information processing apparatus by a finger (including portions such as a palm) being intuitively moved by the user. More specifically, an information processing apparatus according to the present embodiment can cause a display to display operation icons (GUI: Graphical User Interface) whose operability can easily be recognized by the user. The information processing apparatus according to the present embodiment can also cause the display to display movement of a finger of the user imaged by an imaging unit. Further, the information processing apparatus according to the present embodiment can detect movement of a finger of the user to recognize an operation performed by the user on GUIs displayed on the display. Therefore, the information processing apparatus according to the present embodiment can execute various functions in accordance with GUIs displayed on the display and movement of a finger of the user. As a result, the user can operate various GUIs displayed on the display by intuitively moving the finger so that various functions provided with the information processing apparatus can be selected/executed.

FIG. 1 is a conceptual diagram of an example of using an information processing apparatus according to an embodiment of the present invention. As shown in FIG. 1, the user can select/execute various functions provided with the information processing apparatus by moving a finger as if to operate various GUIs displayed on the display by the user's finger without using a remote control.

Details of an information processing apparatus according to an embodiment of the present invention having features described above will be described below. In embodiments below, the TV 100 is taken as an example of the information processing apparatus according to an embodiment of the present invention to describe the embodiments, but the present invention is not limited to such an example. For example, the information processing apparatus may be a personal computer or an information processing apparatus having a display for various operations. Or, the information processing apparatus may cause the display of an external device to display such an operation menu like various kinds of recording/reproducing devices such as a hard disk recorder and Digital Versatile Disc (DVD) recorder or a game machine. In the following description, an expression of "finger" does not necessarily indicate only a portion of fingers of a human being and may indicate a whole hand including a palm and wrist.

2. Information Processing Apparatus According to an Embodiment (2-1. Function Configuration of the TV 100)

First, the function configuration of the TV set 100 (hereinafter, referred to as the TV 100), which is an example of an information processing apparatus according to an embodiment of the present invention, will be described. FIG. 2 is a block diagram showing the function configuration of the TV 100 according to the embodiment.

As shown in FIG. 2, the TV 100 mainly includes an imaging unit 102, a user region detection unit 104, a state transition processing unit 105, a pickup image display processing unit 106, the GUI display control unit 108, a GUI management unit 110, a GUI operation determination unit 112, a GUI operation storage unit 114, a processing execution unit 116, and the display unit 118. These components are connected by a bus and controlled by a Central Processing Unit (CPU). Details of each component of the TV 100 will be described below.

(The Imaging Unit 102)

The imaging unit 102 includes an optical system such as a lens for causing light from an object to form an image on an imaging surface and an image pickup device such as a Charge Coupled Device (CCD) having the imaging surface. The imaging unit 102 converts an object image captured through the lens into an electric signal and outputs the electric signal. Incidentally, the image pickup device provided with the imaging unit 102 is not limited to the CCD and may be, for example, a Complementary Metal Oxide Semiconductor (CMOS). It is also possible to drive a zoom lens, focus lens (not shown) or the like by controlling a driving mechanism of the imaging unit 102 so that an object is imaged in an appropriate zoom and focus in accordance with a user operation. A video signal imaged by the imaging unit 102 is converted into a digital signal by an AD converter (not shown) and then transmitted to the user region detection unit 104.

(The User Region Detection Unit 104)

The user region detection unit 104 detects a region of finger (hand) of a user contained in a video region imaged by the imaging unit 102. As shown in FIG. 2, the user region detection unit 104 mainly includes a movement detection unit 120, a flesh color detection unit 122, and an arithmetic processing unit 124. Details of each component constituting the user region detection unit 104 will be described below.

(The Movement Detection Unit 120)

The movement detection unit 120 detects movement of a hand of the user based on the so-called frame difference method that extracts a video difference between a predetermined frame imaged by the imaging unit 102 and a frame imaged prior to the frame. For example, the movement detection unit 120 can extract a difference between a frame imaged by the imaging unit 102 and the previous image recorded in a frame memory (not shown), that is, a difference portion between both frames. Thus, the movement detection unit 120 can recognize a portion of movement from the previous frame by extracting a difference between both frames. The movement detection unit 120 generates an image constituted by only regions corresponding to movement portions recognized in this manner as a movement region mask image and transmits the image to the arithmetic processing unit 124.

In the present embodiment, the movement detection unit 120 detects movement of an imaged object from a difference between frames in front and behind, but the present invention is not limited to this. For example, the movement detection unit 120 can recognize movement of the user more precisely by including a more complex detection function, but the present invention is not intended to improve detection accuracy of movement of the user and thus, details will not be described. That is, the movement detection unit 120 can detect movement inside a region imaged by the imaging unit 102 by various methods and the detection is not limited to a specific detection method.

(The Flesh Color Detection Unit 122)

The flesh color detection unit 122 detects flesh color regions present in a predetermined frame imaged by the imaging unit 102. While the movement detection unit 120 described above can detect movement of predetermined objects in an imaged region, if, for example, any body other than a hand of the user is moving, the movement detection unit 120 will have detected movement of the body. Therefore, by providing the flesh color detection unit 122 in addition to the movement detection unit 120, the user region detection unit 104 according to the present embodiment can detect movement of a hand of the user more reliably.

For detection of a flesh color region, for example, information such as the hue, saturation, and brightness of each pixel is calculated based on color information of each pixel constituting a pickup image picked up by the imaging unit 102. Based on the calculated information, the flesh color detection unit 122 can determine flesh color regions contained in the pickup image.

An image picked up by the imaging unit 102 has RGB color information consisting of red (R), green (G), and blue (B) for each pixel. The flesh color detection unit 122 converts the RGB color information into Hue, Saturation, and Brightness (HSV) information. Here, HSV is information consisting of three components of the hue, saturation, and brightness. The hue means the type of color such as red, blue, and yellow. The saturation means vividness of color. The brightness means brightness of color.

The flesh color detection unit 122 converts RGB color information of each pixel constituting an image picked up by the imaging unit 102 into HSV information by, for example, formula shown below:

$$H = 60 \times \frac{G - B}{MAX - MIN} \quad (1)$$

$$H = 60 \times \frac{B - R}{MAX - MIN} + 120 \quad (2)$$

$$H = 60 \times \frac{R - G}{MAX - MIN} + 240 \quad (3)$$

$$S = 255 \times \frac{MAX - MIN}{MAX} \quad (4)$$

$$V = MAX \quad (5)$$

Here, R, G, and B are values of RGB color information of each pixel constituting an image picked up by the imaging unit 102 and are represented by, for example, numbers of 0 to 255. "MAX" is the maximum value of RGB values of each pixel constituting an image picked up by the imaging unit 102 and "MIN" is the minimum value thereof. In Formula (1), the hue (H) can be determined when the R value is the maximum value (MAX) among RGB values of some image. In Formula (2), the hue (H) can be determined when the G value is the maximum value (MAX) among RGB values of some image. In formula (3), the hue (H) can be determined when the B value is the maximum value (MAX) among RGB values of some image. From Formula (1) to Formula (5) shown above, values in the ranges of 0 to 359 for H, 0 to 255 for S, and 0 to 255 for V are calculated.

The flesh color detection unit 122 can calculate the HSV values of each pixel constituting an image picked up by the imaging unit 102 from Formula (1) to Formula (5) shown above. If, for example, color information of some pixel constituting an image picked up by the imaging unit 102 is R=208, G=145, and B=130, the HSV values are calculated as H=11, S=95, and V=208.

Since the value (H) related to the hue in the HSV values is independent, the flesh color detection unit 122 can determine predetermined hue regions in an image picked up by the imaging unit 102.

Here, the hue representing the skin of a human being is empirically known to be about H=6 to 38. Therefore, the flesh color detection unit 122 can extract flesh color regions contained in a pickup image by extracting pixels having H=6 to 38 from pixels constituting the image picked up by the constituted by only a flesh color region recognized in this manner as a flesh color region mask image and transmits the image to the arithmetic processing unit 124.

The above RGB values and HSV values are only examples used to describe the present embodiment and the present invention is not limited to such examples. For example, RGB values in the above examples are represented as values of 0 to 255, but naturally other numeric values, for example, 0 to 1 or the percentage representation can also be used and it should be understood that the above Formulas (1) to (5) are to be changed accordingly.

(The Arithmetic Processing Unit 124)

The arithmetic processing unit 124 generates an input operation region image to be displayed in the display unit 118 based on the movement region mask image generated by the movement detection unit 120 and the flesh color region mask image generated by the flesh color detection unit 122 described above. The arithmetic processing unit 124 can generate an input operation region image by, for example, synthesizing an image region constituting the movement region mask image and that constituting the flesh color region mask image based on an AND operation. Thus, by synthesizing a movement region mask image and a flesh color region mask image based on the AND operation, an input operation region image can be generated by extracting only a region in which a hand of the user moved.

After various kinds of processing by the state transition processing unit 105 and the pickup image display processing unit 106 being performed on the input operation region image generated in this manner, the image is displayed in the display unit 118. Therefore, only a portion of video in which the user's hand moves in video picked up by the imaging unit 102 is displayed in the display unit 118.

In the present embodiment, the user region detection unit 104 determines a region in which a hand of the user moves by using movement detection and flesh color detection jointly, but the present invention is not necessarily limited to the above example. For example, the imaging unit 102 equipped with an infrared sensor can naturally generate a temperature distribution image to further improve precision of detecting a region in which a hand of the user moves. Moreover, according to the flesh color detection described above, there is a possibility that a region corresponding to the face of the user is also extracted. Therefore, it is also possible to determine a portion corresponding to the face of the user in a pickup image region by using a face sensing technology to exclude a region corresponding to the face of the user from an input operation region image based on the NOT operation. As the face sensing technology, for example, a support vector machine (SVM), boosting, a neural network, or Eigen-Faces can be used.

(The State Transition Processing Unit 105)

The state transition processing unit 105 that determines whether to display various GUIs or pickup images in the display unit 118 based on an input operation region image generated by the user region detection unit 104 will be described. The user can operate various GUIs displayed in the display unit 118 by moving a hand. Thus, if no hand of the user is contained in video picked up by the imaging unit 102 or, even if a hand is contained and the hand hardly moves, there is no need to cause the display unit 118 to display a pickup image. That is, it is necessary to cause the display unit 118 to display a pickup image only when the user moves a hand desiring to perform a predetermined operation. Therefore, in the present embodiment, the state transition processing unit 105 determines whether to display a pickup image in the display unit 118 based on an input operation region image generated by the user region detection unit 104.

The state transition processing unit 105 determines, for example, whether the number of pixels constituting an input operation region image is equal to or greater than a predetermined threshold set in advance continuously extending over a period equal to or longer than a predetermined time set in advance. If the number of pixels constituting an input operation region image is equal to or greater than a predetermined threshold over a period equal to or longer than a predetermined time, the state transition processing unit 105 determines that the user desires to operate GUIs displayed in the display unit 118 and transmits the input operation region image to the pickup image display processing unit 106. Subsequently, after scaling processing and coordinate transformation processing by the pickup image display processing unit 106 being performed, the input operation region image is displayed in the display unit 118.

Incidentally, a state in which, with an input operation region image including a moving hand of the user being displayed in the display unit 118, the user can operate various GUIs displayed in the display unit 118 will be called a "GUI operation state" below. On the other hand, a state in which the display unit 118 does not display any pickup image because the user does not operate various GUIs displayed in the display unit 118 will be called a "Operation wait state" below.

The predetermined time or the threshold of the number of pixels to determine whether to allow a transition to the GUI operation state may be set arbitrarily and are not limited to specific values. A predetermined time set to allow a transition from the operation wait state to the GUI operation state will be called an "operation state transition setting time" in the following description.

If, as described above, the number of pixels constituting an input operation region image is equal to or greater than a predetermined threshold set in advance continuously extending over a period equal to or longer than the operation state transition setting time, the state transition processing unit 105 allows a transition from the operation wait state to the GUI operation state. If, on the other hand, the number of pixels constituting an input operation region image is not equal to or greater than a predetermined threshold set in advance continuously extending over a period equal to or longer than the operation state transition setting time, the state transition processing unit 105 maintains the operation wait state. If, in the GUI operation state, for example, the number of pixels constituting an input operation region image is equal to or less than a predetermined threshold set in advance continuously extending over a period equal to or longer than a predetermined time set in advance, the state transition processing unit 105 allows a transition from the GUI operation state to the operation wait state. A predetermined time set to allow a transition from the GUI operation state to the operation wait state will be called a "wait state transition setting time" in the following description.

With the transition between the GUI operation state and the operation wait state being controlled by the state transition processing unit 105 in this manner, the TV 100 according to the present embodiment can cause the display unit 118 to display an input operation region image only when the user desires to operate GUIs. Therefore, the display unit 118 is not caused to display an input operation region image when any operation of GUIs is not desired such as when the user enjoys viewing a predetermined program.

(The Pickup Image Display Processing Unit 106)

Next, the pickup image display processing unit 106 that performs predetermined processing on an input operation region image generated by the user region detection unit 104 so that the input operation region image can be displayed in the display unit 118 will be described. If a transition from the operation wait state to the GUI operation state is caused by the state transition processing unit 105 described above, the pickup image display processing unit 106 performs predetermined processing on an input operation region image. As shown in FIG. 2, the pickup image display processing unit 106 mainly includes a scaling processing unit 126 and the coordinate transformation processing unit 128. Details of each component constituting the pickup image display processing unit 106 will be described below.

(The Scaling Processing Unit 126)

The scaling processing unit 126 scales an input operation region image based on the valid pixel number of the display unit 118. As described above, the input operation region image is basically an image including only a moving hand of the user. Thus, the number of pixels of a region including the hand of the user is different depending on the distance between the TV 100 and the user and imaging performance of the imaging unit 102. Therefore, the scaling processing unit 126 performs scaling processing on the input operation region image so that the display unit 118 is caused to typically display an input operation region image of a constant size.

After a transition to the GUI operation state being caused by the state transition processing unit 105, for example, the scaling processing unit 126 calculates the average number of images and the center of gravity of input operation region images up to several frames before. Then, the scaling processing unit 126 calculates the scaling ratio so that the ratio of the calculated average number of pixels to the valid pixel number of the display unit 118 becomes a predetermined ratio. For example, the scaling processing unit 126 can scale an input operation region image so that the image has the number of pixels equal to 10% of the valid pixel number of the display unit 118. In this case, the scaling processing unit 126 can scale an input operation region image, for example, around the calculated center of gravity.

Accordingly, an input operation region image of a constant size is typically displayed in the display unit 118 regardless of imaging performance of the imaging unit 102 or the distance to the user.

The above scaling ratio can be set, for example, to a predetermined value during initialization and can naturally be changed by the user when necessary.

(The Coordinate Transformation Processing Unit 128)

Coordinate transformation processing can be performed by the coordinate transformation processing unit 128 on an input operation region image after, as described above, scaling processing being performed thereon. The coordinate transformation processing unit 128 performs coordinate transformations to screen coordinates corresponding to the display unit 118 on an input operation region image on which scaling processing has been performed.

The coordinate system of an input operation region image generated from a pickup image may be different from screen coordinates of the display unit 118 depending on specifications of the imaging unit 102 or display specifications of the display unit 118. In such a case, the coordinate transformation processing unit 128 performs coordinate transformation processing on an input operation region image to convert the image to a coordinate system fitting to the screen coordinates of the display unit 118. Accordingly, an input operation region image after coordinate transformation processing being performed thereon will be correctly displayed in the display unit 118.

Figure 3:
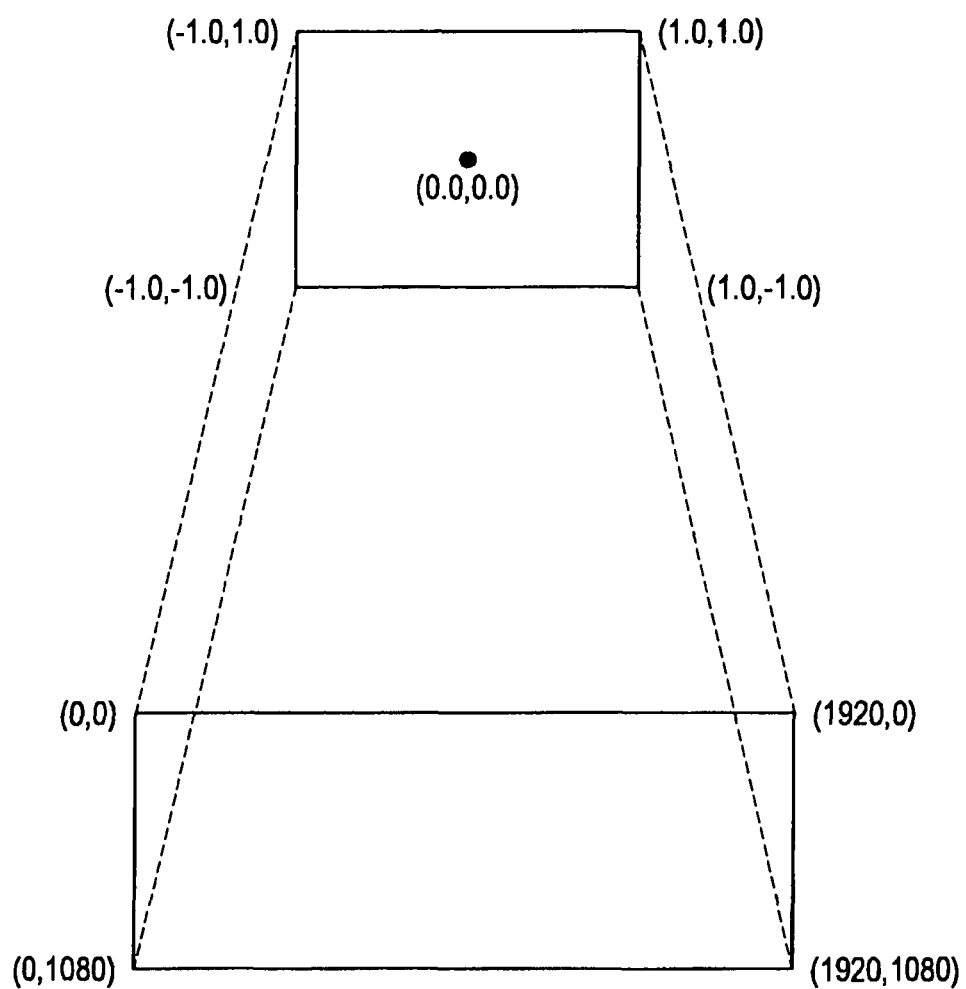
FIG. 3 is a conceptual diagram exemplifying processing of coordinate transformation by a coordinate transformation processing unit 128 in the embodiment.

FIG. 3 is a conceptual diagram exemplifying processing of coordinate transformation by the coordinate transformation processing unit 128. The example shown in FIG. 3 is a case in which the coordinate system of an input operation region image on which scaling processing has been performed is a coordinate system whose center is the origin and the screen coordinates of the display unit 118 are 1920 (horizontal)× 1080 (vertical) with the origin at the upper left corner. In such a case, if the screen coordinates of the display unit 118 are Xs and Ys and coordinates of an input operation region image are Xc and Yc, the coordinate transformation processing unit 128 can perform coordinate transformations by formulas shown below:

$Xs = \text{screen width}(1920) \times (Xc+1.0)/2$ $Ys = \text{screen height}(1080) \times (2.0-(Yc+1.0))/2$ The above formulas provide coordinate transformations that do not take the aspect ratio into consideration and it is naturally possible to perform coordinate transformations by considering the aspect ratios of images picked up by the imaging unit 102 and the display of the display unit 118. Clipping processing normally applied, for example, can be used for coordinate transformation that takes the aspect ratio into consideration and details of the processing will not be described. In the above example, a case in which the coordinate transformation processing unit 128 performs coordinate transformation processing in such a way that the coordinate system of an image picked up by the imaging unit 102 fits into the screen coordinates of the display unit 118 is described, but the present invention is not limited to such an example. For example, the coordinate transformation processing unit 128 may perform coordinate transformation processing so that the screen coordinates of the display unit 118 are fitted into the coordinate system of an image picked up by the imaging unit 102.

In this manner, an input operation region image on which various processing has been performed is transmitted to the display unit 118, where the input operation region image is displayed.

(The Display Unit 118)

The display unit 118 is a display apparatus such as a Cathode Ray Tube (CRT), Liquid Crystal Display (LCD), and organic ElectroLuminescence display (organic EL display). The display unit 118 can display a predetermined program received from a broadcasting station via an antenna (not shown), an input operation region image transmitted from the pickup image display processing unit 106, various GUIs and the like. The user can select/execute various functions of the TV 100 based on various GUIs displayed in the display unit 118 and video of the hand of the user contained in input operation region images.

(The GUI Display Control Unit 108)

Next, the GUI display control unit 108 that controls the display of GUIs corresponding to various functions provided with the TV 100 in the display unit 118 will be described. The GUI display control unit 108 functions as an icon display control unit of the present invention.

When a transition to the GUI operation state is caused by the state transition processing unit 105 described above or the user selects some function by the GUI operation determination unit 112 described below, the GUI display control unit 108 controls the display unit 118 to switch the display of various GUIs or the like. For example, the GUI display control unit 108 causes the display unit 118 to display, among GUIs managed by the GUI management unit 110, those GUIs instructed by the GUI operation determination unit 112.

Details of display control of GUIs in the display unit 118 by the GUI display control unit 108 will be described in a processing flow described below.

(The GUI Management Unit 110)

The GUI management unit 110 manages GUIs corresponding to various functions provided with the TV 100. GUIs displayed in the display unit 118 is caused to display consist of operation icons whose operations are intuitively recognized by the user. Therefore, it is necessary to cause the display unit 118 to display different GUIs corresponding to various functions provided with the TV 100. The GUI management unit 110 manages such a plurality of different GUIs. The GUI management unit 110 functions as an icon management unit of the present invention.

Here, an example of GUIs managed by the GUI management unit 110 will be described with reference to FIG. 4. FIG. 4 is an explanatory view exemplifying GUIs managed by the GUI management unit 110.

A slide bar GUI 400 shown in FIG. 4 is used, for example, for volume adjustments, brightness/lightness adjustments of the display, or sliding of the screen vertically. That is, the user can cause the TV 100 to perform volume adjustments, brightness/lightness adjustments of the display, or vertical sliding of the screen by moving a finger of the user vertically with respect to the slide bar GUI 400 displayed in the display unit 118.

Next, a dial GUI 402 is used, for example, for volume adjustments, frame advancing, or switching of input numbers in a setting screen. That is, the user can cause the TV 100 to perform volume adjustments, frame advancing, or switching of input numbers in a setting screen by moving a finger of the user as if to draw a circle with respect to the dial GUI 402 displayed in the display unit 118.

Next, a push button GUI 404 is used, for example, for channel selection, number input of a setting screen, or decision of menu selection. That is, the user can cause the TV 100 to perform channel selection, number input of a setting screen, or decision of menu selection by moving a finger of the user, for example, downward with respect to the push button GUI 404 displayed in the display unit 118.

Next, an ON/OFF switch GUI 406 is used, for example, for an ON/OFF decision of a predetermined mode, for example, the sound deadening mode, pause mode, or bilingual mode. That is, the user can cause the TV 100 to perform an ON/OFF decision of a predetermined mode, for example, the sound deadening mode, pause mode, or bilingual mode by moving a finger of the user, for example, upward with respect to the ON/OFF switch GUI 406 displayed in the display unit 118.

Next, a jog dial GUI 408 is used, for example, for channel switching, volume adjustments, setting mode switching, or menu display switching. That is, the user can cause the TV 100 to perform channel switching, volume adjustments, setting mode switching, or menu display switching by moving a finger of the user, for example, vertically with respect to the jog dial GUI 408 displayed in the display unit 118.

GUIs displayed in FIG. 4 are only an example of GUIs managed by the GUI management unit 110 and the display unit 118 is caused to display in the present embodiment and the present invention is not limited to these GUIs. That is, the GUI management unit 110 can have various GUIs corresponding to various functions and modes provided with the TV 100 and the GUI display control unit 108 can cause the display unit 118 to display these GUIs.

The GUI management unit 110 also manages event issue definition information corresponding to managed GUIs. As described above, the user can select/execute various functions of the TV 100 corresponding to each GUI by moving a finger of the user with respect to each GUI displayed in the display unit 118. Whether the user has operated a GUI displayed in the display unit 118 is determined by the GUI operation determination unit 112 described below. Thus, it is necessary for the GUI operation determination unit 112 to know what manner of movement of a finger of the user to determine as an operation of a GUI. Therefore, the GUI management unit 110 needs to manage information about movement of a finger of the user necessary for operation input, that is, event issue definition information for each GUI. Normally, movement of a finger of the user necessary for operation input is different for each GUI. For example, the slide bar GUI 400 shown in FIG. 4 supports only a vertical operation and the dial GUI 402 supports only an operation in a rotation direction. Particularly for the push button GUI 404 and the like, it is necessary to define movement of a finger of the user necessary for operation input in advance. Therefore, the GUI management unit 110 manages event issue definition information for each GUI. Accordingly, the GUI operation determination unit 112 can correctly determine whether the user has operated a GUI based on GUIs displayed in the display unit 118, movement of a finger of the user contained in input operation region images, and event issue definition information managed by the GUI management unit 110.

FIG. 5 is an explanatory view exemplifying GUIs and event issue definition information managed by the GUI management unit 110 in the embodiment. As shown in FIG. 5, the GUI management unit 110 can manage the function of the TV 100, the GUI corresponding to the function, and event issue definition information corresponding to the GUI in a database.

For example, a slide bar GUI in the horizontal direction corresponds to volume adjustments of the TV 100 and the GUI management unit 110 has event issue definition information corresponding to the slide bar GUI. In the example shown in FIG. 5, the event issue definition information of the slide bar GUI is "Movement of five continuous frames horizontally from the cursor position". This means that when, for example, the center of gravity of a pixel region in an input operation region image showing a moving finger of the user moves to the left or to the right five frames continuously from the cursor position of the slide bar GUI, operation input to the slide bar GUI can be accepted. That is, if the center of gravity of a pixel region in an input operation region image moves to the right five frames continuously from the cursor position of the slide bar GUI, the volume is raised and if the center of gravity of a pixel region in an input operation region image moves to the left five frames continuously, the volume is lowered. Thus, with a database as shown in FIG. 5 being managed by the GUI management unit 110, the GUI operation determination unit 112 can correctly accept a GUI operation from the user based on the database.

The database shown in FIG. 5 is only an example to describe the present embodiment and the present invention is not limited to the example. That is, it is naturally possible, for example, that the event issue definition information shown in FIG. 5 is set in the initialization or the like, or is arbitrarily modified by the user. Therefore, the user can arbitrarily modify GUIs or event issue definition information settings so that GUIs can be operated by movement of a finger most suitable for perception of the user.

(The GUI Operation Determination Unit 112)

As described above, the GUI operation determination unit 112 determines whether the user has operated a GUI based on GUIs displayed in the display unit 118, the center of gravity of a pixel region in an input operation region image, and event issue definition information managed by the GUI management unit 110. The GUI operation determination unit 112 functions as an operation determination unit of the present invention.

For example, the GUI operation determination unit 112 calculates for each frame the center of gravity of a pixel region of finger of the user contained in an input operation region image on which predetermined processing has been performed by the pickup image display processing unit 106. The center of gravity calculated in this manner is stored in a GUI operation storage unit described below. Accordingly, the GUI operation determination unit 112 can recognize movement of a finger of the user by calculating a trajectory from centers of gravity of past frames to the center of gravity of the current frame. By comparing the trajectory of the center of gravity calculated in this manner and a pixel region where the GUI displayed in the display unit 118 is positioned, the GUI operation determination unit 112 can determine whether to accept operation input of a GUI based on the event issue definition information. Details of an example of GUI operation determined by the GUI operation determination unit 112 will be described in a processing flow described below.

(The GUI Operation Storage Unit 114)

As described above, the GUI operation storage unit 114 is a storage domain to store centers of gravity calculated by the GUI operation determination unit 112, trajectories of centers of gravity and the like. The GUI operation storage unit 114 can be constituted by a nonvolatile memory or hard disk.

(The Processing Execution Unit 116)

The processing execution unit 116 executes various functions provided with the TV 100 in accordance with a determination result of the GUI operation determination unit 112 described above. As described above, each GUI displayed in the display unit 118 corresponds to various functions provided with the TV 100. Therefore, if, for example, the GUI operation determination unit 112 determines that a slide bar type GUI corresponding to volume adjustments has been operated by the user, the processing execution unit 116 performs volume adjustments of the TV 100. Similarly, if, for example, the GUI operation determination unit 112 determines that a push button type GUI corresponding to channel selection has been operated by the user, the processing execution unit 116 switches a channel of the TV 100.

With the above function configuration being provided, the TV 100 according to the present embodiment can cause the display unit 118 to display GUIs of operation icons from which the user can easily recognize an operation thereof. The TV 100 can also cause the display unit 118 to display movement of a finger of the user picked up of the imaging unit 102 provided with the TV 100. Event issue definition information corresponding to each GUI displayed in the display unit 118 may be managed by the GUI management unit 110. Accordingly, the TV 100 according to the present embodiment can accept operation input of GUIs based on GUIs displayed in the display unit 118, movement of a finger of the user, and event issue definition information. That is, the TV 100 according to the present embodiment enables the user to select/execute various functions by intuitively moving a finger of the user by displaying GUI of operations icons in the display unit 118.

(2-2. Overall Processing Flow from Imaging Processing to GUI Operation Processing)

Next, an overall flow of processing in which GUI processing is performed by the user using the TV 100 in the present embodiment configured as described above will be described.

FIG. 6 is a flow chart showing an overall flow of processing in which a GUI operation is performed by the user using the TV 100 according to the embodiment. FIG. 6 shows a flow of overall processing and details of each piece of processing shown in FIG. 6 will be described in a processing flow of each piece of processing described below.

As shown in FIG. 6, imaged data input processing is performed at step 700. This is processing of generating an input operation region image to be displayed in the display unit 118 by determining only a region in which a finger (hand) of the user moves from a pickup image picked up by the imaging unit 102. As described above, the above processing is performed by the movement detection unit 120, the flesh color detection unit 122, and the arithmetic processing unit 124 provided with the user region detection unit 104.

Next, at step 800, processing of causing a transition to the GUI operation sate or the operation wait state is performed based on the input operation region image generated at step 700. This is processing in which a transition to which state to cause is determined based on the number of pixels of the input operation region image generated at step 700, a predetermined time and threshold set in advance and the like and a transition to the determined state is caused. As described above, the above processing is performed by the state transition processing unit 105.

Next, at step 900, whether the current state is a GUI operation state or operation wait state is determined. If the current state is a GUI operation state, processing at step 1000 and thereafter will be performed and if the current state is an operation wait state, no GUI operation by the user will be performed.

Next, at step 1000, pickup image display processing is performed to cause the display unit 118 to correctly display the input operation region image generated at step 700. This is processing in which scaling processing and coordinate transformation processing are performed on the input operation region image generated at step 700. As described above, the above processing is performed by the scaling processing unit 126 and the coordinate transformation processing unit 128 provided with the pickup image display processing unit 106.

Subsequently, at step 1200, processing of executing functions of the TV 100 corresponding to each GUI is performed based on GUIs displayed in the display unit 118 and movement of a finger of the user displayed in the display unit 118 at step 1000. This is processing of determining whether the user has operated a GUI based on, for example, GUIs displayed in the display unit 118, a trajectory of the center of gravity of a pixel region of a finger of the user constituting an input operation region image, and event issue definition information. Further, this is processing of changing GUIs displayed in the display unit 118 in accordance with a result of the determination or of executing various functions provided with the TV 100. As described above, the above processing is performed by the GUI operation determination unit 112, the GUI display control unit 108, and the processing execution unit 116.

With the processing flow described above, the TV 100 according to the present embodiment can execute various functions provided with the TV 100 in accordance with intuitive movement of a finger by the user by displaying GUIs of operation icons that are easily understood by the user.

Next, a detailed processing flow of each piece of processing shown in FIG. 6 will be described below.

(2-3. Imaged Data Processing Flow)

First, of the processing flow shown in FIG. 6, a detailed processing flow at step 700 concerning imaged data processing will be described. FIG. 7 is a flow chart showing the detailed processing flow of imaged data processing at step 700 shown in FIG. 6.

In the imaged data processing flow, first at step 702, imaged data picked up by the imaging unit 102 is input into the movement detection unit 120 and the flesh color detection unit 122 provided with the user region detection unit 104.

Next, at step 704, the movement detection unit 120 determines only portions with movement from the image picked up by the imaging unit 102 based on a difference between the input current image data and past image data. Then, the movement detection unit 120 generates a movement region mask image, which is an image constituted by only movement regions determined in this manner, and transmit the image to the arithmetic processing unit 124.

Next, at step 706, the flesh color detection unit 122 performs the above HSV conversion processing and the like on the input current image data. The flesh color detection unit 122 thereby determines only flesh color regions from the image picked up by the imaging unit 102. Then, the flesh color detection unit 122 generates a flesh color region mask image, which is an image constituted by only flesh color regions determined in this manner, and transmits the image to the arithmetic processing unit 124.

Next, at step 708, the arithmetic processing unit 124 generates an input operation region image based on the movement region mask image transmitted at step 704 and the flesh color region mask image transmitted at step 706. As described above, the arithmetic processing unit 124 generates an input operation region image by performing the AND operation on a pixel region constituting a movement region mask image and that constituting a flesh color region mask image. As a result, the arithmetic processing unit 124 can generate an image constituted by only moving a finger of the user if possible as an input operation region image.

Next, at step 710, the input operation region image generated at step 708 is transmitted to the state transition processing unit 105.

The imaged data processing consisting of the above processing flow is performed on each piece of imaged data picked up by the imaging unit 102 at predetermined times.

(2-4. State Transition Processing Flow)

Figure 8:
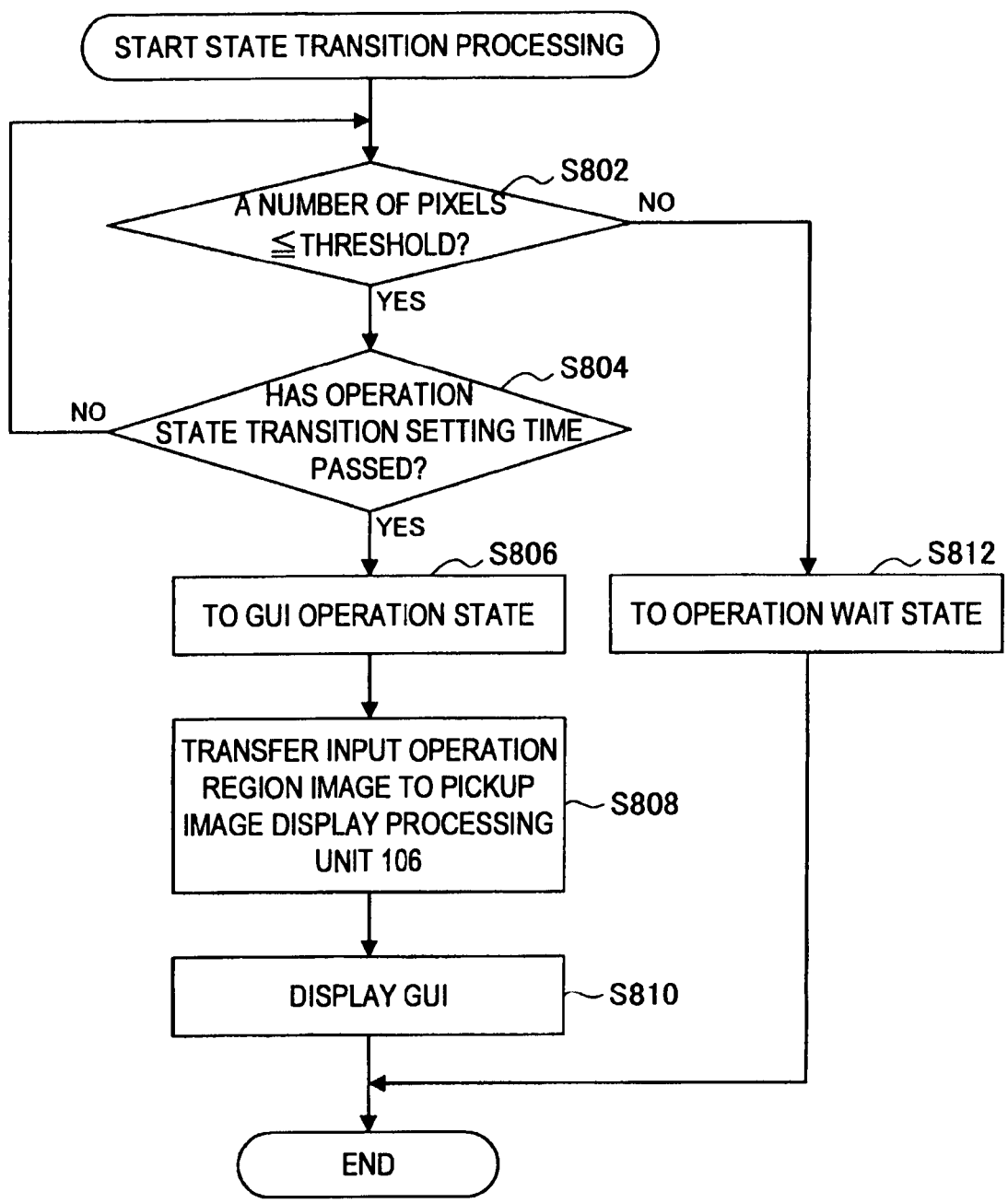
FIG. 8 is a flow chart showing the detailed processing flow of state transition processing at step 800 shown in FIG. 6 in the embodiment.

Next, of the processing flow shown in FIG. 6, a detailed processing flow at step 800 concerning state transition processing will be described. FIG. 8 is a flow chart showing the detailed processing flow of state transition processing at step 800 shown in FIG. 6.

In the state transition processing flow, first at step 802, the state transition processing unit 105 determines whether the number of pixels constituting an input operation region image transmitted from the user region detection unit 104 is equal to or greater than a predetermined threshold set in advance. If no moving finger (hand) of the user is contained in an image picked up by the imaging unit 102, that is, if the user does not desire a GUI operation, there is no need to cause the display unit 118 to display the pickup image. Therefore, if it is determined at step 802 that the number of pixels constituting an input operation region image is not equal to or greater than a threshold set in advance, the state transition processing unit 105 maintains the operation wait state at step 812. That is, no image picked up by the imaging unit 102 is displayed in the display unity 118.

On the other hand, if it is determined at step 802 that the number of pixels constituting an input operation region image is equal to or greater than a threshold set in advance, the state transition processing unit 105 performs processing at step 804. That is, the state transition processing unit 105 determines whether a state in which the number of pixels constituting the input operation region image is equal to or greater than the threshold continues for an operation state transition setting time or longer. If, for example, a hand of the user enters an imagable region of the imaging unit 102 only instantaneously, displaying a pickup image in the display unit 118 would yield only an annoying result for the user. Therefore, the state transition processing unit 105 performs determination processing at step 804 so that the display unit 188 is caused to display a pickup image only when the user truly desires to operate a GUI displayed in the display unit 118. That is, the state transition processing unit 105 causes a transition to the GUI operation state only if it is determined that the number of pixels constituting an input operation region image is equal to or greater than the threshold set in advance continuously for the operation state transition setting time or longer. As a result, only if the user moves a hand in the imagable region of the imaging unit 102 for a predetermined time or longer, an image including the hand of the user will be displayed in the display unit 118.

Subsequently, at step 808, the input operation region image is transmitted to the pickup image display processing unit 106, where necessary processing for the display in the display unit 118 is performed on the image.

After a transition to the GUI operation state being caused, at step 810, the GUI display control unit 108 may cause the display unit 118 to display predetermined GUIs. For example, the GUI display control unit 108 may cause the display unit 118 to display initial menus when the user desires to operate GUIs.

Figure 9:
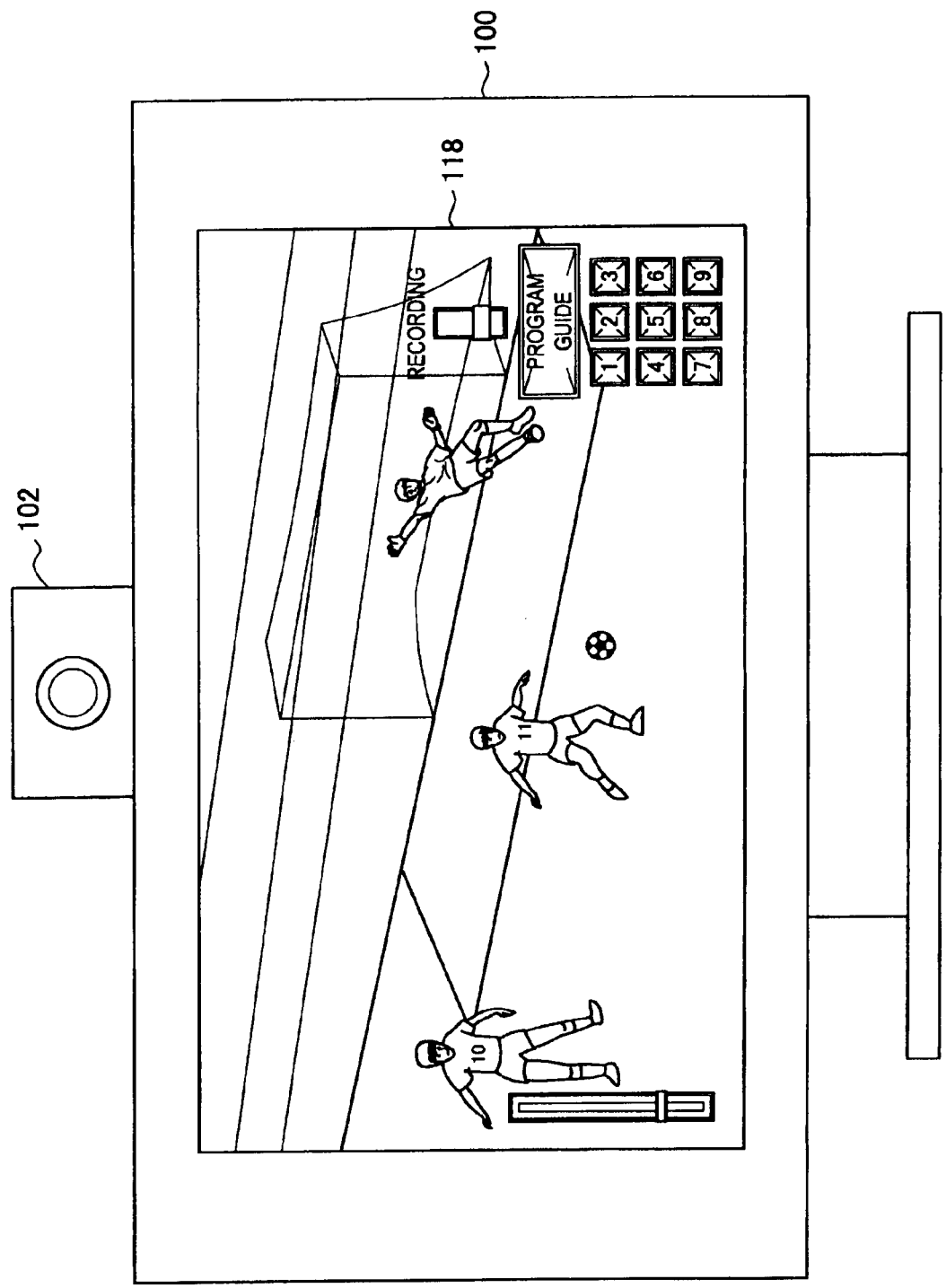
FIG. 9 is an explanatory view exemplifying GUIs to be displayed in the display unit 118 by the GUI display control unit 108 when a transition to a GUI operation state in the embodiment.

FIG. 9 is an explanatory view exemplifying GUIs to be displayed in the display unit 118 by the GUI display control unit 108 at step 810. In the example shown in FIG. 9, a slide bar GUI to adjust the volume, a push button GUI to select the channel, a push button GUI to switch the screen to a program guide, and an ON/OFF switch GUI to record a program being viewed are displayed in a display constituting the display unit 118. These GUIs displayed in the display unit 118 when a transition to the GUI operation state takes place can arbitrarily be set by default or the like and are not limited to the example shown in FIG. 9. For example, the user can arbitrarily make settings so that, when a transition to the GUI operation state takes place, GUIs corresponding to frequently used functions are displayed in the display unit 118. While in the flow shown in FIG. 8, an example in which GUIs are displayed in the display unit 118 when a transition to the GUI operation state takes place is described, but it is naturally possible to cause the display unit 118 to display these GUIs also in the operation wait state. That is, while the display unit 118 is caused to typically display predetermined GUIs, an input operation region image including a finger (hand) of the user can be made to be displayed only when a transition to the GUI operation state takes place. Thus, which GUI to display in what position of the display unit 118 at what time can arbitrarily be set and changed by the user.

(2-5. Pickup Image Display Processing Flow)

Figure 10:
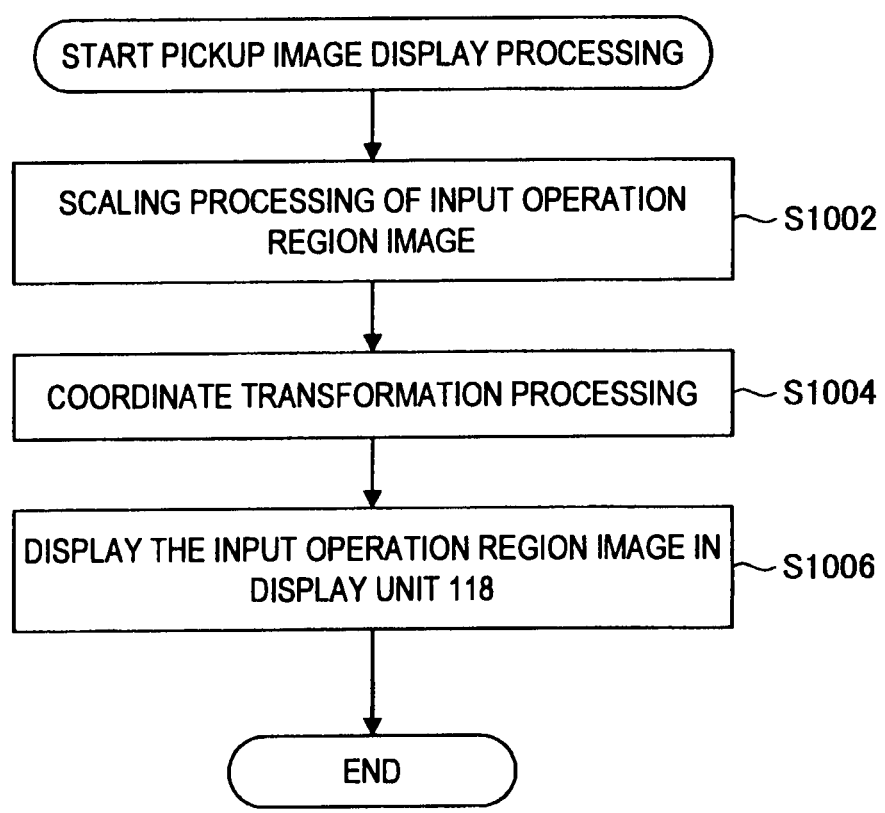
FIG. 10 is a flow chart showing the detailed processing flow of pickup image display processing at step 1000 shown in FIG. 6 in the embodiment.

Next, of the processing flow shown in FIG. 6, a detailed processing flow at step 1000 concerning pickup image display processing will be described. FIG. 10 is a flow chart showing the detailed processing flow of pickup image display processing at step 1000 shown in FIG. 6.

In the pickup image display processing flow, first at step 1002, the scaling processing unit 126 performs scaling processing on an input operation region image. As described above, the scaling processing unit 126 performs scaling processing in such a way that the ratio of the number of pixels constituting an input operation region image transmitted from the state transition processing unit 105 to the valid pixel number of the display unit 118 becomes a predetermined ratio. The scaling processing is performed, as described above, based on the center of gravity of an input operation region image, the average number of pixels and the like.

Next, at step 1004, the coordinate transformation processing unit 128 performs coordinate transformations on the input operation region image on which scaling processing has been performed so that the input operation region image fits to the screen coordinates of the display unit 118. As described above, the processing is performed when the coordinate system of the input operation region image and the screen coordinates of the display unit 118 are different systems.

Then, at step 1006, the input operation region image, that is, a region including a finger portion of the user of an image picked up by the imaging unit 102 is displayed in the display unit 118. At this point, the pickup image display processing unit 106 can display the input operation region image in the display unit 118 by flipping the image horizontally. Accordingly, the hand of the user is displayed in the display unit 118 in agreement with movement of a finger of the user. As a result, the user can select/execute functions of the TV 100 corresponding to each GUI as if to operate the GUI displayed in the display unit 118 with the user's own hand.

Figure 11:
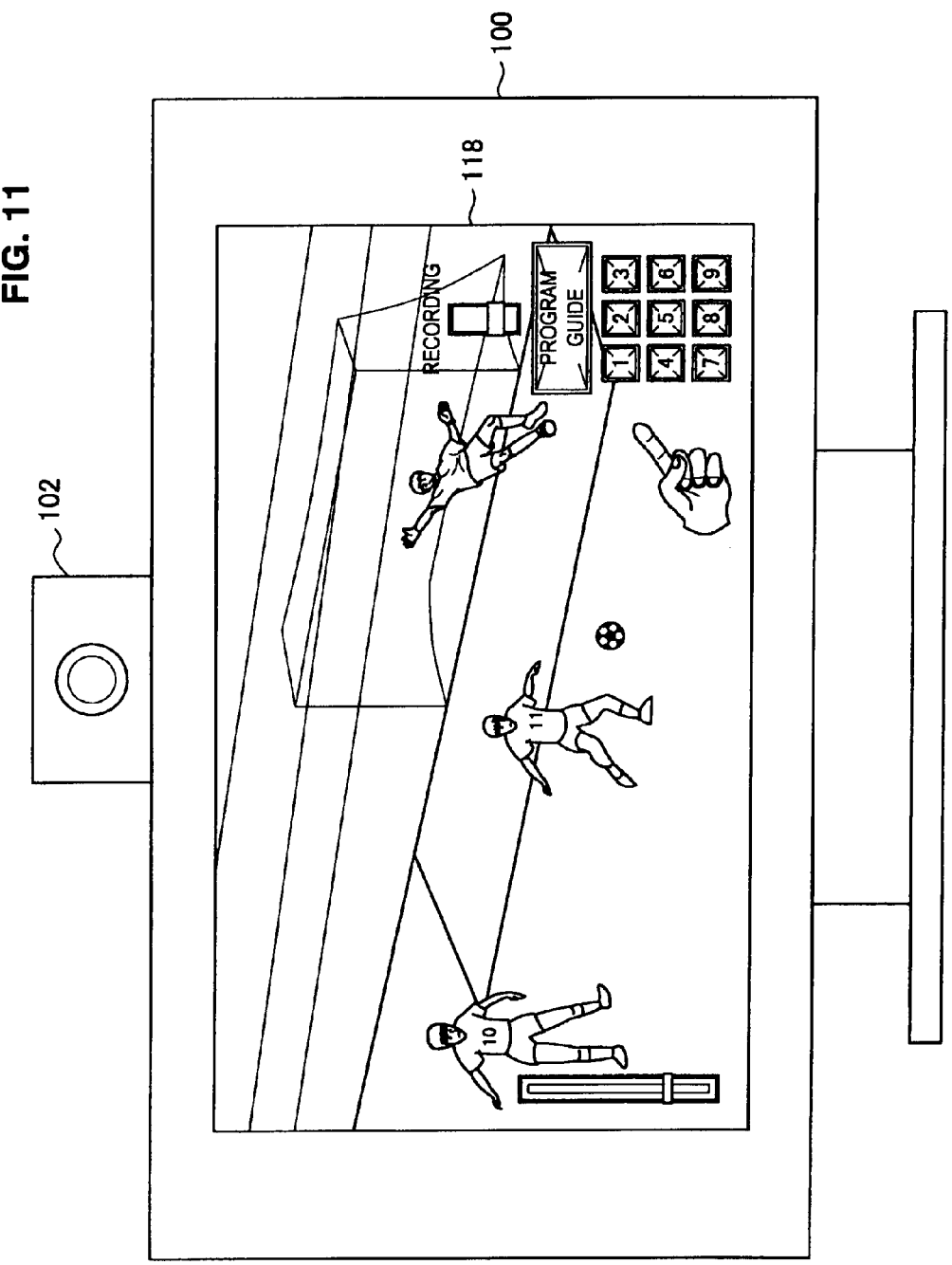
FIG. 11 is an explanatory view exemplifying a case in which an input operation region image is displayed in the display unit 118 in the embodiment.

FIG. 11 is an explanatory view exemplifying a case in which an input operation region image is displayed in the display unit 118 at step 1006. It is evident from FIG. 11 that an input operation region image including a user's hand is displayed in a display constituting the display unit 118. The user can operate any GUI displayed in the display by moving the hand with reference to the position of the user's hand displayed in the display.

(2-6. GUI Operation Processing Flow)

Figure 12:
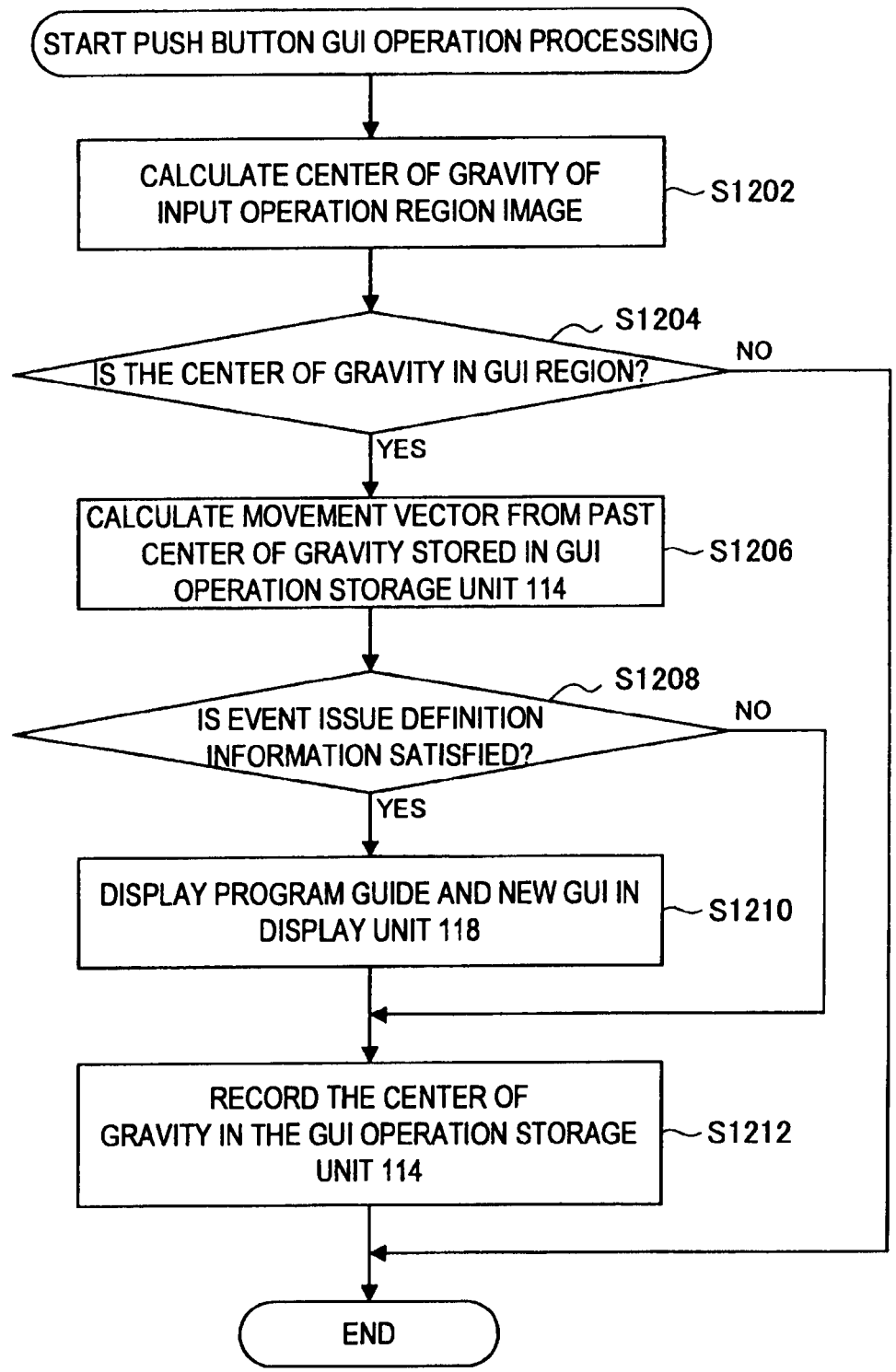
FIG. 12 is a flow chart showing the detailed processing flow of operating a push button GUI at step 1200 shown in FIG. 6 in the embodiment.

Next, of the processing flow shown in FIG. 6, a detailed processing flow at step 1200 concerning GUI operation processing will be described. In the following description, operation processing of a push button GUI for program guide display in the example shown in FIG. 11 is taken as an example. FIG. 12 is a flow chart showing the detailed processing flow of operating the push button GUI at step 1200 shown in FIG. 6.

In the GUI operation processing flow, first at step 1202, the GUI operation determination unit 112 calculates the center of gravity of a pixel region constituting an input operation region image currently displayed in the display unit 118.

Next, at step 1204, the GUI operation determination unit 112 determines whether or not the center of gravity calculated at step 1202 is positioned in the pixel region of the display unit 118 where the push button GUI is displayed. If a finger of the user displayed in the display unit 118 is not positioned at the push button GUI, there is no need to execute the function corresponding to the GUI. Therefore, if it is determined at step 1204 that the center of gravity is not positioned in the pixel region of the display unit 118 where the push button GUI is displayed, processing corresponding to the GUI is not performed.

On the other hand, if it is determined at step 1204 that the center of gravity is positioned in the pixel region of the display unit 118 where the push button GUI is displayed, the GUI operation determination unit 112 performs processing at step 1206. That is, the GUI operation determination unit 112 calculates a motion vector of the center of gravity based on centers of gravity of past input operation region images recorded in the GUI operation storage unit 114 and the current center of gravity. Details thereof will be described below and centers of gravity calculated by the GUI operation determination unit 112 are recorded in the GUI operation storage unit 114 at step 1212. Therefore, the GUI operation determination unit 112 can recognize the motion vector of the center of gravity by calculating a trajectory of the center of gravity based on the current center of gravity and as many centers of gravity as the predetermined number of frames in the past. The motion vector calculated in this manner corresponds to a trajectory of the finger moved by the user.

Next, at step 1208, the GUI operation determination unit 112 determines whether the motion vector calculated at step 1206 satisfies event issue definition information managed by the GUI management unit 110. If, for example, the event issue definition information shown in FIG. 5 is referenced, the event issue definition information of the push button GUI corresponding to the program guide display is "Continuous downward movement in three frames from the button position". Thus, if a motion vector calculated based on the calculated current center of gravity and centers of gravity of past two frames moves downward in the display unit 118, the GUI operation determination unit 112 can determine that the event issue definition information is satisfied. If, on the other hand, a motion vector calculated based on the calculated current center of gravity and centers of gravity of past two frames does not move downward in the display unit 118, the GUI operation determination unit 112 can determine that the event issue definition information is not satisfied.

If it is determined at step 1208 that event issue definition information is satisfied, the GUI operation determination unit 112 transmits a determination result to the processing execution unit 116 and the GUI display control unit 108. After receiving the determination result, the processing execution unit 116 displays a program guide in the display unit 118 at step 1210. Further, the GUI display control unit 108 displays new GUIs in the display unit 118 at step 1210.

Figure 13:
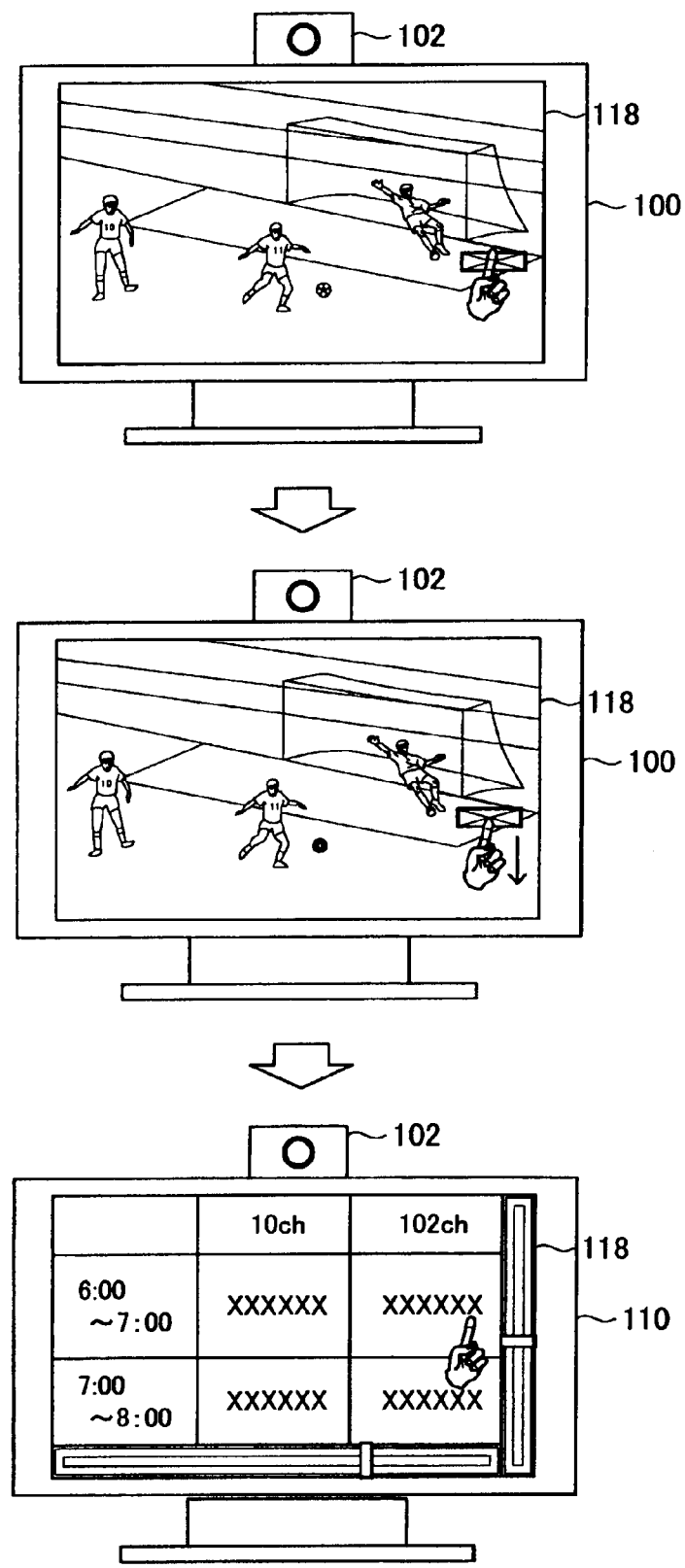
FIG. 13 is a conceptual diagram exemplifying the flow in which the display unit 118 is updated at step 1210 shown in FIG. 12 in the embodiment.

FIG. 13 is a conceptual diagram exemplifying the flow in which the display unit 118 is updated at step 1210. Reference to FIG. 13 shows that if the user moves a finger downward over a push button GUI for a fixed time (in the present embodiment, a time corresponding to three frames), the display of the display unit 118 is switched to a program guide. It is also evident that new slide bar GUIs to slide the program guide vertically or horizontally are displayed in the display unit 118. Accordingly, the user can slide the program guide displayed in the display unit 118 by moving a finger in a position corresponding to the slide bar GUI.

Which GUIs to be displayed when a push button GUI in the program guide display is selected can be managed by, for example, the GUI management unit 110. Therefore, after receiving instructions from the GUI operation determination unit 112, the GUI display control unit 108 can display a new GUI in the display unit 118 based on information managed by the GUI management unit 110.

Then, at step 1212, the GUI operation determination unit 112 records the center of gravity calculated at step 1202 in the GUI operation storage unit 114. As described above, the center of gravity recorded at this step will be used to calculate a motion vector.

In this manner, the GUI operation determination unit 112 can determine whether the push button GUI in the program guide display displayed in the display unit 118 has been operated by the user. Moreover, depending on a determination result, the processing execution unit 116 can display a program guide in the display unit 118 and the GUI display control unit 108 can display a new GUI in the display unit 118.

In the above example, operation processing of the push button GUI in the program guide display is taken as an example, and it is naturally possible to execute other GUIs in a similar processing flow. That is, based on event issue definition information of the target GUI, the GUI operation determination unit 112 can determine presence/absence of a GUI operation by the user with reference to a database managed by the GUI management unit 110.

In the above example, the GUI operation determination unit 112 calculates a motion vector based on the center of gravity of a pixel region constituting an input operation region image, but the present invention is not limited to this. A value other than the center of gravity, for example, a predetermined position of a pixel region constituting an input operation region image such as a pixel value corresponding to a fingertip may be used as a reference value, instead of the center of gravity. Thus, which position of a pixel region constituting an input operation region image to use as the reference value for determination can be changed when necessary by changing the setting.

With the processing flow described above, the TV 100, which is an example of an information processing apparatus according to the present embodiment, can cause the display unit 118 to display an input operation region image including a finger (hand) moved by the user only when the user desires to select/execute a predetermined function of the TV 100. The TV 100 can also cause the display unit 100 to display GUIs for operation icons whose operability is easily recognizable by the user in accordance with various functions provided with the TV 100. Further, the TV 100 can easily determine whether the user operates GUIs displayed in the display unit 118 by managing event issue definition information for each GUI. Accordingly, the TV 100 can execute various functions provided with the TV 100 or display a new GUI in the display unit 118 in accordance with movement of a finger of the user. That is, the TV 100, which is an example of an information processing apparatus according to the present embodiment, enables the user to select/execute various functions by a finger being intuitively moved by the user after GUIs of operations icons being displayed in the display unit 118 constituted by, for example, a display.

3. Modifications

The TV 100 described above is an example to describe the above embodiment, the present invention is not limited to such an example, and still other functions can be added. Modifications of an information processing apparatus in the above embodiment will be described below.

3-1. First Modification (Using the Sound Input Function)

A TV 200 as the first modification of the TV 100 according to the above embodiment will be described. In addition to the various functions held by the TV 100 described above, the TV 200 in the first modification is provided with a sound input function so that the display unit 118 can be caused to display various GUIs in accordance with the sound input.

Figure 14:
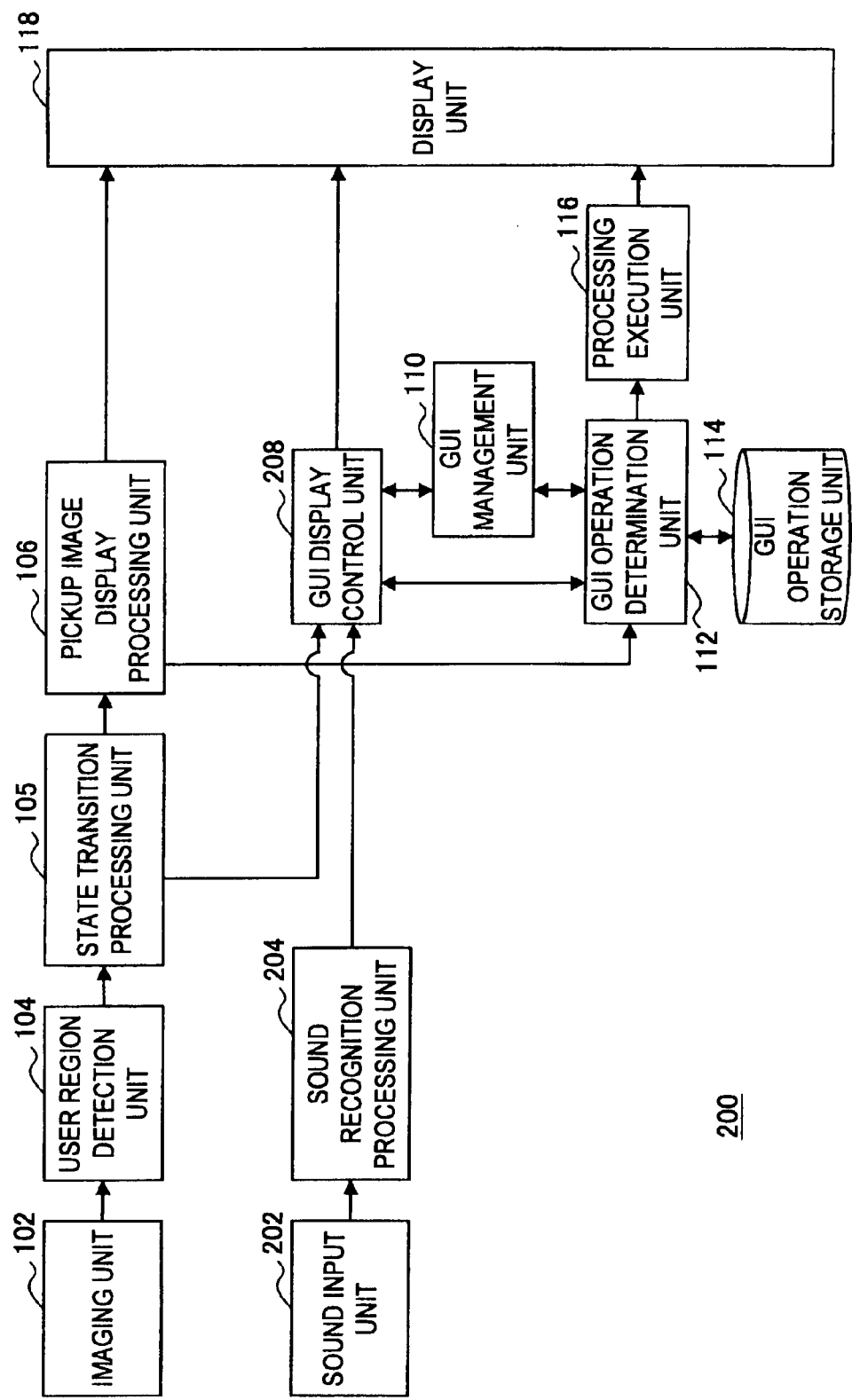
FIG. 14 is a block diagram showing the function configuration of a TV set 200 in a first modification.

FIG. 14 is a block diagram showing the function configuration of the TV set 200 in the first modification. When compared with the TV 100 described above, the TV 200 in the first modification further includes a sound input unit 202 and a sound recognition processing unit 204. Also, the TV 200 includes a GUI display control unit 208 that performs processing such as switching of GUIs displayed in the display unit 118 in accordance with sound input from the sound input unit 202 and a GUI management unit 210 that manages GUIs corresponding to predetermined sound input as a database.

The sound input unit 202 is constituted by, for example, a microphone and after a sound uttered by the user being input, converts the sound into a sound signal as an electric signal. Then, the sound signal is converted by an AD converter (not shown) or the like into a digital signal, which is transmitted to the sound recognition processing unit 204.

The sound recognition processing unit 204 performs a frequency analysis of sound data supplied from, for example, the sound input unit 202 at predetermined intervals to extract spectra and other acoustic characteristic quantities (parameters). The sound recognition processing unit 204 recognizes sound input into the sound input unit 202 based on parameters extracted as described above and preset sound patterns. A determination result by the sound recognition processing unit 204 is transmitted to the GUI display control unit 208.

Sound recognition by the sound recognition processing unit 204 is not limited to a specific recognition method and various methods capable of recognizing sound input into the sound input unit 202 can be used.

The GUI display control unit 208 executes display switching of GUIs displayed in the display unit 118 based on a sound determination result transmitted from the sound recognition processing unit 204 and so on. The GUI display control unit 208 can decide GUIs to be displayed in the display unit 118 based on, for example, sound input managed by the GUI management unit 210 and a database that associates with a GUI corresponding to the sound. The GUI management unit 210 can manage a database associating sound input with a GUI corresponding to the sound like, for example, a slide bar GUI for sound volume adjustments for sound input such as "sound volume", "volume", and "sound" and a push button GUI for channel switching for sound input such as "channel" and "xx station". Therefore, the GUI display control unit 208 can select an appropriate GUI and cause the display unit 118 to display the GUI based on the database managed by the GUI management unit 210.

As a result of the foregoing, the TV 200 in the first modification can cause the display unit 118 to display GUIs corresponding to various functions of the TV 200 desired by the user in accordance with a sound uttered by the user. As a result, the user can cause the display unit 118 to display a GUI corresponding to a function by intuitively uttering the function of the TV 200 desired by the user and select/execute various functions by intuitively moving a finger with respect to displayed GUIs.

3-2. Second Modification (Using the Cursor GUI)

Next, a TV 300 as the second modification of the TV 100 according to the above embodiment will be described. In addition to the various functions held by the TV 100 described above, the TV 300 in the second modification enables the user to specify any display region including text and any object such as a person and article displayed in a display by moving a finger. Further, the TV 300 in the second modification can perform predetermined processing on any display region specified by the user.

Figure 15:
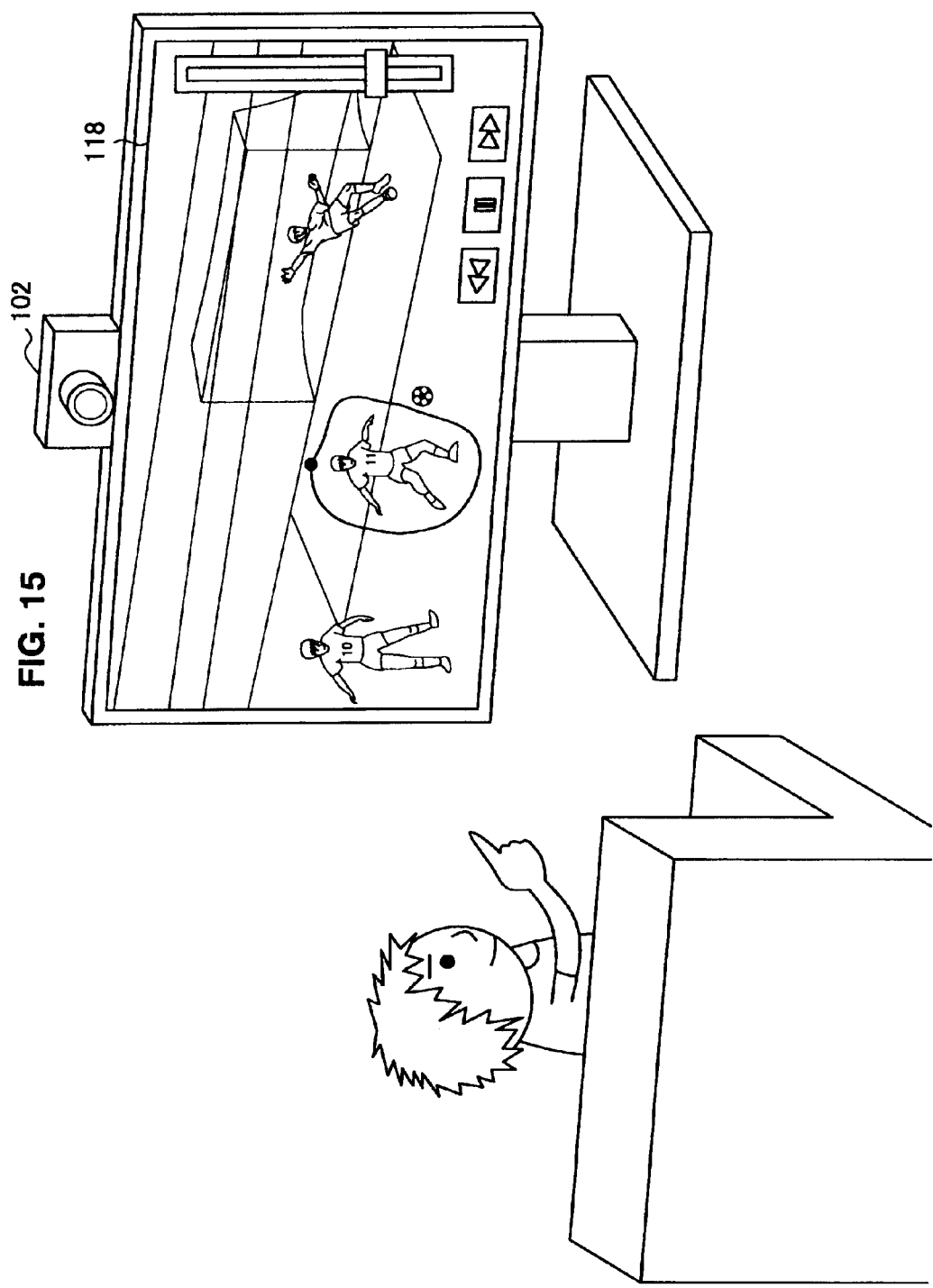
FIG. 15 is a conceptual diagram in which the user selects an arbitrary image region in a display using a TV set 300 in a second modification.

FIG. 15 is a conceptual diagram in which the user selects an arbitrary display region in a display using the TV set 300 in the second modification. As shown in FIG. 15, for example, if there is any scene, person, or text on the user's mind in a program being viewed, the user intuitively moves a finger as if to enclose the applicable person. In response to movement of the finger, the TV 300 images movement of the finger of the user by the imaging unit 102 and causes the cursor GUI to move in the display in agreement with movement of the finger of the user. The user can have many ways of enjoying the display region enclosed by a trajectory of the cursor in this manner such as an enlarged display, printing, attachment to E-mail, and search using the WEB. Details of the TV set 300 in the second modification having features described above will be described below.

Figure 16:
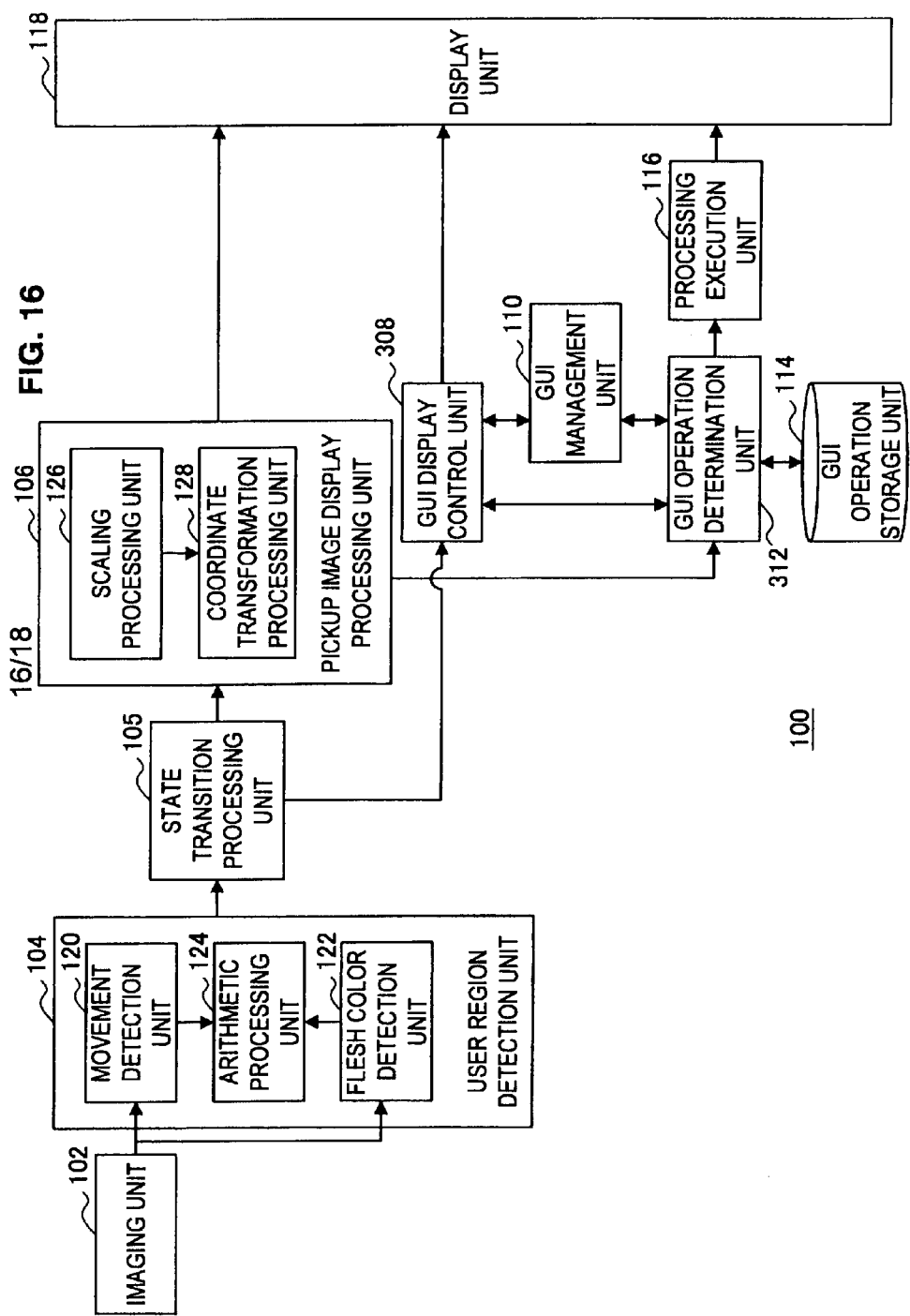
FIG. 16 is a block diagram showing the function configuration of the TV set 300 in the second modification.

FIG. 16 is a block diagram showing the function configuration of the TV set 300 in the second modification. The TV set 300 in the second modification has a function configuration similar to that of the TV 100 described above and mainly a GUI display control unit 308 and a GUI operation determination unit 312 further have different functions. More specifically, the GUI display control unit 308 has a function of causing the display unit 118 to display the cursor GUI in agreement with movement of a finger of the user. The GUI operation determination unit 312 has a function of determining whether a predetermined display region has been selected by the user based on movement of the cursor GUI.

As shown in FIG. 15, the GUI display control unit 308 causes the display unit 118 to display the cursor GUI in agreement with movement of a finger of the user. Details such as the method of detecting movement of a finger of the user and the like are the same as those of the TV 100 according to the above embodiment and thus will not be described. Based on, for example, the center of gravity of an input operation region image calculated by the GUI operation determination unit 312, the GUI display control unit 308 can cause the display unit 118 to display a circular cursor GUI of a predetermined size around the center of gravity. Like in the TV 100 according to the above embodiment, the GUI operation determination unit 312 can calculate the center of gravity of an input operation region image and a motion vector, which is a trajectory of the center of gravity, to store the center of gravity and the trajectory in the GUI operation storage unit 114. Therefore, the GUI display control unit 308 can cause the display unit 118 to display the trajectory of the cursor GUI in agreement with the motion vector of the center of gravity calculated by the GUI operation determination unit 312. That is, the GUI display control unit 308 can cause the display unit 118 to display the trajectory of the cursor GUI in agreement with movement of a finger of the user.

Like in the TV 100 according to the above embodiment, the GUI operation determination unit 312 calculates the center of gravity of an input operation region image and a motion vector, which is a trajectory of the center of gravity, to record the center of gravity and the trajectory in the GUI operation storage unit 114. The GUI operation determination unit 312 also determines whether the trajectory of the cursor GUI displayed in the display unit 118 draws a closed curve based on the motion vector. That is, the GUI operation determination unit 312 can determine whether the user has specified a predetermined region of the display unit 118 by moving a finger. For example, the GUI operation determination unit 312 can determine whether the trajectory of the cursor GUI draws a closed curve based on whether the current motion vector intersects with a past motion vector. Even if motion vectors do not intersect, the GUI operation determination unit 312 may determine that the user has specified a predetermined display region by performing trajectory interpolation processing if the motion vector satisfies a predetermined pattern. Here, the trajectory interpolation processing is processing to generate a closed curve enclosing a predetermined display region by, for example, linking the starting point of a motion vector and the current center of gravity even if the motion vector of the center of gravity does not actually draw a closed curve. By performing such trajectory interpolation processing, the user can easily specify a predetermined display region of the display unit 118 even if the user does not cause a finger to make a round correctly.

If the GUI operation determination unit 312 determines that a predetermined display region has been specified by the user, the GUI operation determination unit 312 transmits a determination result to the GUI display control unit 308 and the processing execution unit 116. Accordingly, the GUI display control unit 308 can cause the display unit 118 to display operation GUIs concerning predetermined processing for the specified display region, for example, a slide bar GUI for enlarged display, a push button GUI for access to the WEB and the like. The processing execution unit 116 can perform various kinds of processing such as the enlarged display, access to the WEB, printing, and attachment to E-mail in accordance with a GUI operation by the user.

Figure 17:
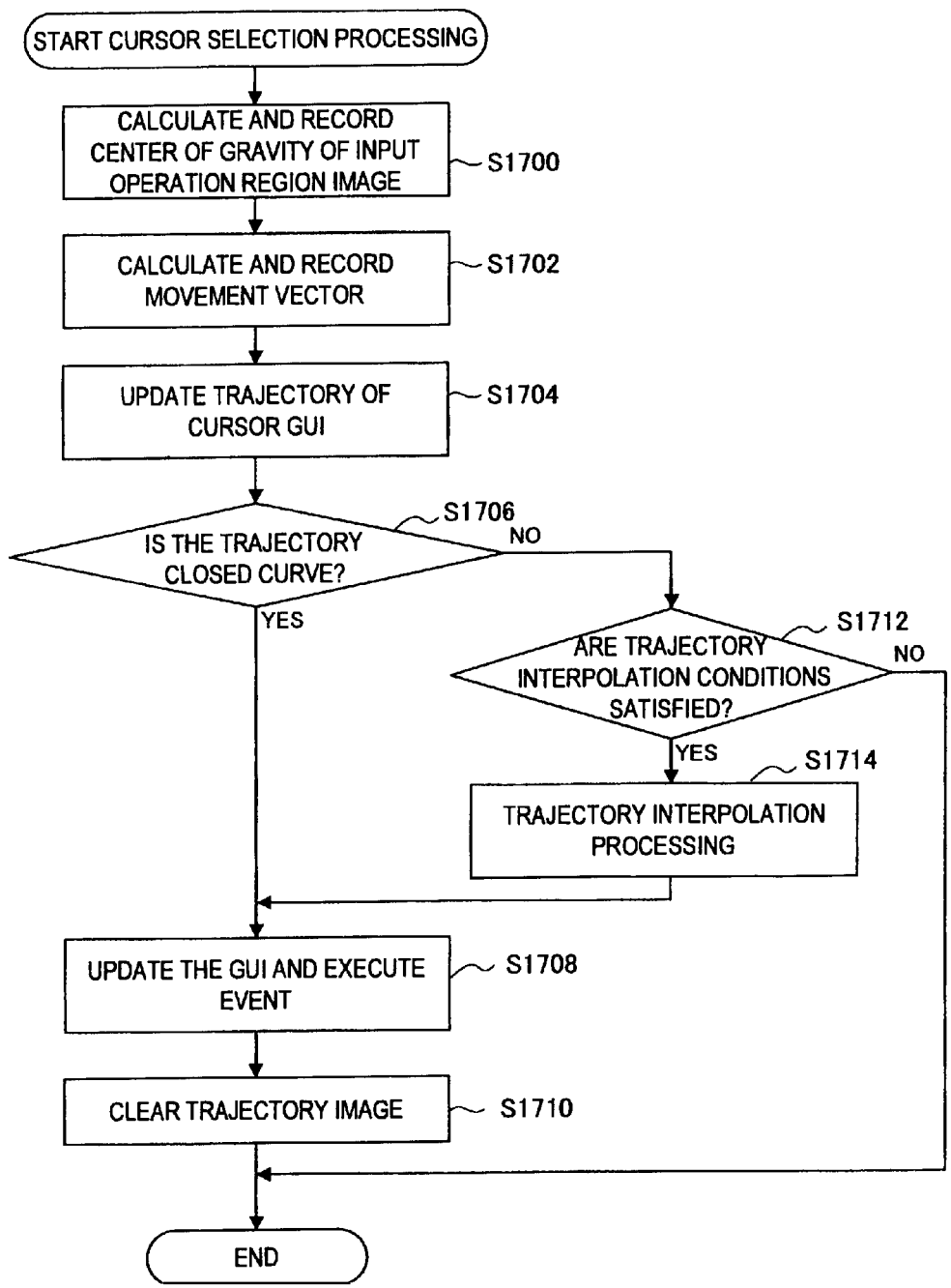
FIG. 17 is a flow chart exemplifying the flow of processing in which the TV set 300 in the second modification performs predetermined processing on a predetermined display region in agreement with movement of a finger of the user.

Next, an example of the flow of predetermined processing on an arbitrary display region performed by the TV 300 in the second modification having the features described above will be described. FIG. 17 is a flow chart exemplifying the flow of processing in which the TV set 300 in the second modification determines a predetermined display region specified in agreement with movement of a finger of the user and performs predetermined processing on the display region. The TV 300 can perform the processing flow shown in FIG. 17 when the user desires instructions on a predetermined display region, for example, a predetermined button GUI displayed in the display unit 118 is selected or there is sound input.

As shown in FIG. 17, at step 1700, the GUI operation determination unit 312 calculates the center of gravity of a pixel region constituting an input operation region image. The GUI operation determination unit 312 also records the calculated center of gravity in the GUI operation storage unit 114.

Figure 18:
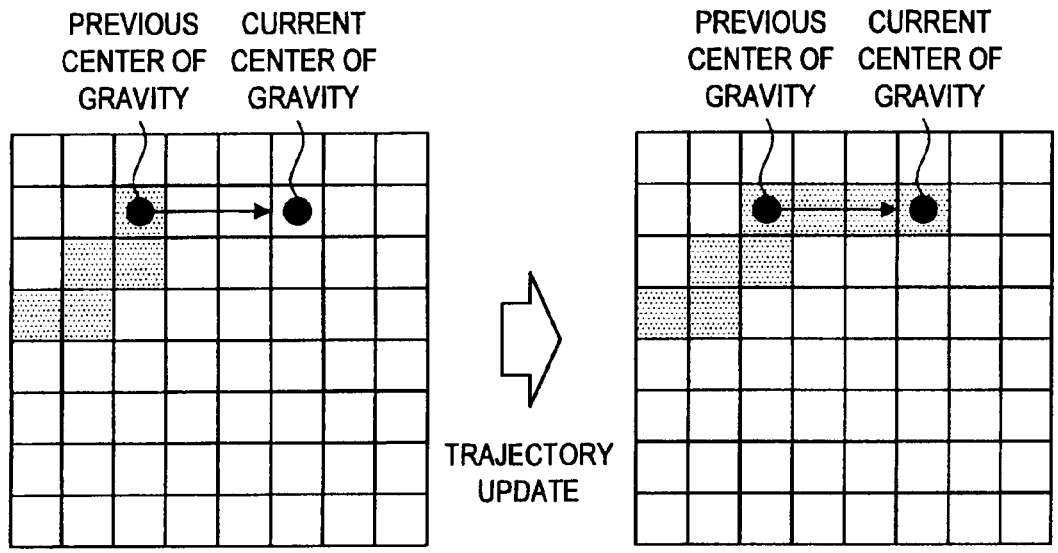
FIG. 18 is a conceptual diagram exemplifying calculation of a motion vector of a center of gravity in the TV set 300 in the second modification.

Next, at step 1702, the GUI operation determination unit 312 calculates a motion vector linking the current center of gravity and past centers of gravity recorded in the GUI operation storage unit 114. The GUI operation determination unit 312 can thereby recognize a trajectory of the center of gravity. The GUI operation determination unit 312 also stores the calculated motion vector in the GUI operation storage unit 114. By linking motion vectors recorded in the GUI operation storage unit 114 in this manner, the GUI operation determination unit 312 can recognize a trajectory of the center of gravity. FIG. 18 shows a conceptual diagram exemplifying a case where motion vectors are calculated by linking centers of the gravity. As shown in FIG. 18, the GUI operation determination unit 312 can calculate a motion vector by linking the current center of gravity to the center of gravity of a pixel region of the previous input operation region image. By linking motion vectors calculated in this manner, the GUI operation determination unit 312 can recognize a trajectory the center of gravity of input operation region images in the display region of the display region 118.

The center of gravity and a motion vector calculated in this manner are transmitted to the GUI display control unit 308. After receiving the center of gravity and a motion vector, at step 1704, the GUI display control unit 308 can cause the display unit 118 to display a cursor GUI of a predetermined size around the coordinate position of the center of gravity and a trajectory of the motion vector as a trajectory of the cursor GUI. Therefore, the GUI display control unit 308 can draw a trajectory of the cursor GUI in the display unit 118 in agreement with movement of a finger of the user.

Next, at step 1706, the GUI operation determination unit 312 determines whether the trajectory of the center of gravity draws a closed curve, that is, a predetermined display region is enclosed by the trajectory of the center of gravity. For example, the GUI operation determination unit 312 can determine whether the trajectory of the center of gravity draws a closed curve based on whether the motion vector calculated at step 1702 intersects with a motion vector calculated in the past.

If it is determined at step 1706 that the center of gravity draws a closed curve, the GUI operation determination unit 312 determines that the display region enclosed by the closed curve is a region specified by the user and transmits the determination result to the GUI display control unit 308 and the processing execution unit 116. Then, at step 1708, the GUI display control unit 308 displays a predetermined operation icon GUI in the display unit 118 and the processing execution unit 116 executes an event corresponding to a GUI operation by the user. Events (functions) that can be executed by a predetermined display region being specified by the user include, for example, the enlarged display of the region, printing, attachment to E-mail, and search using the WEB, but are not limited to specific functions. Thus, for example, by being provided with a communication unit or a connection unit to a printer, the TV 300 can execute various functions on a display region specified by the user. In the above example, the GUI operation determination unit 312 determines a display region enclosed by a closed curve as a region specified by the user, but, for example, a display region outside a closed curve may be determined as a region specified by the user.

In the above description, if it is determined at step 1706 that a closed curve is drawn, processing at step 1708 is performed, but the present invention is not limited to this. It is possible to set, for example, that a specified region is temporarily decided if a closed curve is drawn once, the specified region is formally decided if a closed curve is drawn twice, and the specified region is canceled if a closed curve is drawn three times. Thus, the decision of a display region specified by a closed curve may arbitrarily be changed by, for example, user settings.

Then, at step 1710, the GUI operation determination unit 312 clears the cursor GUI and the trajectory of the cursor GUI displayed in the display unit 118. The GUI operation determination unit 312 may also delete motion vectors of the center of gravity stored in the GUI operation storage unit 114. Accordingly, the user can specify another display region again by moving a finger.

On the other hand, if it is determined at step 1706 that the trajectory of the center of gravity does not draw a closed curve, at step 1712, the GUI operation determination unit 312 determines whether the trajectory of the center of gravity satisfies trajectory interpolation conditions. Here, the trajectory interpolation is processing of linking a trajectory of the center of gravity that does not actually draw a closed curve so that the trajectory forms a closed curve. Accordingly, even if the user does not move a finger to correctly draw a closed curve, the GUI operation determination unit 312 can determine that a closed curve is drawn by performing trajectory interpolation processing.

Trajectory interpolation conditions are also conditions for the GUI operation determination unit 312 to perform trajectory interpolation processing. Trajectory interpolation conditions can arbitrarily be set and are not limited to specific conditions. An example of trajectory interpolation conditions can be that a motion vector completes a circle of a clockwise pattern like "++", "+−", "−−", and "−+" and then a pair of the same sign of + or − reappear. Similarly, a condition can be set that a motion vector complete a circle of a counterclockwise pattern like "−−", "+−", "++", and "−+" and then a pair of the same sign of + or − reappear. Needless to say, these trajectory interpolation conditions are only examples in the present embodiment and are not limited to these.

Figure 19:
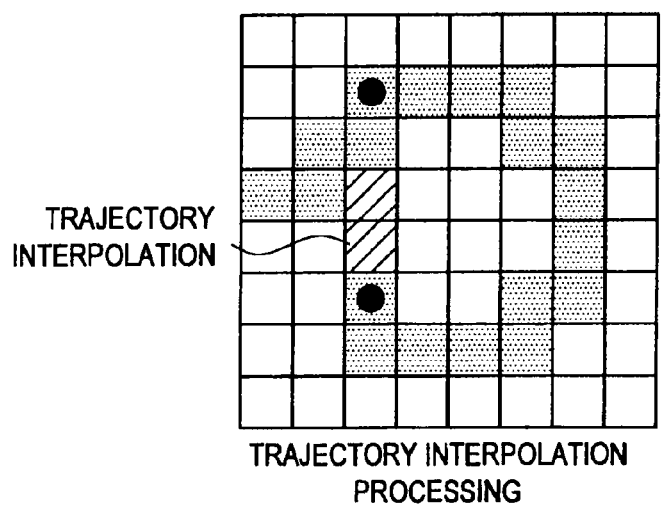
FIG. 19 is a conceptual diagram exemplifying trajectory interpolation processing in the TV set 300 in the second modification.

If it is determined at step 1712 that trajectory interpolation conditions are satisfied, at step 1714, the GUI operation determination unit 312 performs trajectory interpolation processing. That is, the GUI operation determination unit 312 generates a pseudo closed curve by linking the current center of gravity and the starting point of a trajectory of the center of gravity or the like. FIG. 19 is a conceptual diagram exemplifying linking of a trajectory of the center of gravity that does not actually draw a closed curve by trajectory interpolation processing. Reference to FIG. 19 shows that while the trajectory of the center of gravity does not actually draw a closed curve, a closed curve is generated by linking the current center of gravity and any center of gravity in the past. The GUI operation determination unit 312 determines that the closed curve generated in this manner as a display region specified by the user and transmits the determination result to the GUI display control unit 308 and the processing execution unit 116. Then, at step 1708 and step 1710 described above, predetermined processing is performed on the display region specified by the user.

On the other hand, if it is determined at step 1712 that trajectory interpolation conditions are not satisfied, the GUI operation determination unit 312 determines that the user has not yet selected a predetermined display region. Accordingly, the GUI display control unit 308 continues to display the cursor GUI in the display unit 118.

By executing the above steps for each frame imaged by the imaging unit 102, the TV 300 in the second modification can determine whether the user has specified a predetermined display region of the display unit 118. Further, the TV 300 in the second modification can cause the display unit 118 to display operation icon GUIs corresponding to predetermined processing that can be performed on the predetermined display region specified by the user. If an operation icon GUI displayed in this manner is selected by the user, the TV 300 in the second modification can execute various functions corresponding to the GUI. That is, the TV 300 in the second modification can execute various functions on a predetermined object or text specified by a finger being intuitively moved by the user to specify the object or text displayed in a display.

In the foregoing, preferred embodiments of the present invention have been described in detail with reference to attached drawings, but the present invention is not limited to such examples. It should be understood by those skilled in the art that various modifications and alterations may be conceived of as they are within the scope of the appended claims or the equivalents thereof.

In the above embodiments, for example, the description centers on a TV as an example of the information processing apparatus of the present invention, but the present invention is not limited to such an example. For example, the information processing apparatus may be a personal computer or an information processing apparatus equipped with a display for various operations such as a music player and digital radio. Or, the information processing apparatus may be various kinds of recording/reproducing devices such as a hard disk recorder and Digital versatile Disc (DVD) recorder or an information processing apparatus that causes the display of an eternal device to display GUIs like a game machine. For such information processing apparatuses without a display, the above effects of the present invention can be achieved by being provided with a video output terminal to a display provided with an external device or the like without the display unit 118 in the embodiment of the TV 100 described above being provided.

An information processing apparatus may be realized by executing an information processing program that performs processing of various functions of the above embodiment and modifications. The program is stored in, for example, a program storage unit provided with the information processing apparatus or the like and the information processing apparatus can execute various functions and processing described above by the program being read and executed by a Central Processing Unit (CPU). Therefore, the information processing apparatus may add a new function or be upgraded by updating the program. The information processing program may be provided by a recording medium that can be read by an information processing apparatus. The recording medium is, for example, a magnetic disk, optical disk, magneto-optical disk, or flash memory. Or, the information processing program may be delivered via, for example, a network without using a recording medium.

The movement detection, flesh color detection, scaling processing, coordinate transformation processing, and trajectory interpolation processing described above are examples used to describe the above embodiment and the present invention is not limited to the above-described examples. For example, movement detection, flesh color detection, coordinate transformation processing, or trajectory interpolation processing according to a different technique, conditions, or formula from one in the above description is allowed.

It is naturally possible to combine functions held by the TV 100 according to the above-described embodiment, the TV 200 in the first modification, and the TV 300 in the second modification. If, for example, a predetermined display region is specified by the user in the TV 300 in the second modification, GUIs corresponding to processing on the display region can be caused to be displayed in accordance with sound input from the user.

Steps described in flow charts herein include not only processing that is performed chronologically in the order described, but also processing that does not have to be necessarily performed chronologically and may be performed in parallel or individually. Even steps that are processed chronologically can naturally be executed by changing the order thereof according to circumstances. For example, the order of generation of a movement region mask image at step 704 and that of a flesh color region mask image at step 706 shown in FIG. 7 are not limited to the order shown in FIG. 7 and naturally the reverse order or parallel processing of these steps is also possible.

The present invention contains subject matter related to Japanese Patent Application JP 2008-208948 filed in the Japan Patent Office on Aug. 14, 2008, the entire contents of which being incorporated herein by reference.

What is claimed is:

1. An information processing apparatus, comprising:
an imaging unit;
a detecting unit configured to detect movement of a human appendage within images obtained by the imaging unit, the detecting unit being further configured to:
identify a first region within a current one of the images that includes at least a portion of the human appendage, the identification being based on a flesh color associated with the human appendage;
detect movement of an object within a second region of the current image; and
detect the movement of the human appendage when the first region corresponds to the second region;
a sound input unit configured to receive sound;
a sound recognition processing unit configured to recognize a type of the sound received by the sound input unit; and
a processing unit configured to generate an instruction to display an operation icon corresponding to a predetermined processing, based on at least the detection of the movement of the human appendage by the detecting unit and the type of sound recognized by the sound recognition processing unit.

2. The information processing apparatus of claim 1, further comprising at display unit configured to display the operation icon in response to the generated instruction.

3. The information processing apparatus of claim 1, wherein the displayed operation icon comprises a graphical user interface.

4. The information processing apparatus of claim 3, wherein the received sound comprises one or more words spoken by a user, the spoken words indicating a functionality of the graphical user interface.

5. The information processing apparatus of claim 1, further comprising a icon management unit configured to manage information associated with a plurality of operation icons.

6. The information processing apparatus of claim 5, wherein the information managed by the icon management unit identifies the operation icons and corresponding sound types associated with the operation icons.

7. The information processing apparatus of claim 5, wherein the processing unit is further configured to select the displayed operation icon based on the sound type of the received sound and the information managed by the icon management unit.

8. The information processing apparatus of claim 5, wherein
the processing unit is further configured to generate an instruction to sequentially display an input operation region image comprising, among pixel regions constituting the current image, a pixel region including at least the portion of the human appendage.

9. The information processing apparatus of claim 8, wherein the human appendage comprises at least one of a human finger or a human hand.

10. The information processing apparatus of claim 8, wherein the icon management unit is further configured to manage event issue definition information for the plurality of operation icons.

11. The information processing apparatus of claim 10, wherein the event issue definition information comprising, for the plurality of operation icons, a condition for determining that the corresponding ones of the operation icons has been operated by a user.

12. The information processing apparatus of claim 11, further comprising an operation determination unit configured to determines whether the user has operated the displayed operation icon based on the displayed input operation region image and the event issue definition information.

13. The information processing apparatus of claim 12, wherein the processing unit is further configured to perform the predetermined processing corresponding to the displayed operation icon, when the user has operated the displayed operation icon.

14. The information processing apparatus of claim 12, wherein the operation determination unit is further configured to recognize a trajectory of the movement of the human appendage.

15. The information processing apparatus of claim 14, wherein the operation determination unit is further configured to:

compute (i) a center of gravity of the pixel regions of the input operation region image and (ii) a motion vector of the center of gravity; and recognize the trajectory of the movement of the human appendage, based on at least the computed motion vector and center of gravity.

16. The information processing apparatus of claim 12, wherein the operation determination unit is further configured to determine whether the user has operated the operation icon based on the detected movement and the event issue definition information.

17. The information processing apparatus of claim 16, wherein the operation determination unit is further configured to:

determine, for the operation icon, whether the recognized motion satisfies the corresponding condition for user operation; and determine that the user has operated the displayed operation icon, when the detected movement satisfied the user operation condition.

18. The information processing apparatus according to claim 17, wherein the processing unit is further configured to update the displayed operation icon based on the detected movement.

19. The information processing apparatus of claim 1, wherein the detection unit is further configured to:

compute a metric indicative of a presence of the flesh color within the first region of the current image;

determine whether a value of the metric exceeds a threshold value; and identify the portion of the user appendage within the first region, when the metric value exceeds the threshold value.

20. The information processing apparatus of claim 1, wherein the metric represents a number of pixels within the first region associated with at least one of (i) a hue that corresponds to a predetermined value or (ii) a hue that falls within a range of predetermined values.

21. The information processing apparatus of claim 1, wherein the detection unit is further configured to:

identify the portion of the user appendage within one or more prior images obtained by the imaging unit;

obtain a temporal period during which the imaging unit obtained the current image and the one or more prior images; and determine whether the temporal period exceeds a threshold time period; and detect the movement of the user appendage when the first region corresponds to the second region and when the temporal period exceeds the threshold time period.

22. A computer-implemented method, comprising:

detecting a movement of a human appendage within images obtained by an imaging unit, the detecting comprising:

identifying a first region within a current one of the images that includes at least a portion of the human appendage, the identification being based on a flesh color associated with the human appendage;

identifying movement of an object within a second region of the current image; and detecting the movement of the human appendage within the images, when the first region corresponds to the second region;

receiving an input of sound from a user;

recognizing a type associated with the received sound; and generating, using a processor, an instruction to display an operation icon corresponding to a predetermined processing, based on the detected movement of the user human appendage and the type associated with the received sound input.

23. A tangible, non-transitory computer-readable medium storing instructions that, when executed by at least one processor, perform a method for simulating an interactive conversation with a recorded subject, the method comprising the steps of:

detecting a movement of a human appendage within images obtained by an imaging unit, the detecting comprising:

identifying a first region within a current one of the images that include at least a portion of the human appendage, the identification being based on a flesh color associated with the human appendage;

identifying movement of an object within a second region of the current image; and detecting the movement of the human appendage within the images, when the first region corresponds to the second region;

receiving an input of sound from a user;

recognizing a type associated with the received sound; and generating an instruction to display an operation icon corresponding to a predetermined processing, based on the detected movement of the human appendage and the type associated with the received sound input.

* * * * *